(12) United States Patent
Harel et al.

(10) Patent No.: US 9,166,665 B2
(45) Date of Patent: Oct. 20, 2015

(54) SYSTEM, METHOD AND APPARATUS FOR MOBILE TRANSMIT DIVERSITY USING SYMMETRIC PHASE DIFFERENCE

(71) Applicant: GOOGLE INC., Mountain View, CA (US)

(72) Inventors: Haim Harel, New York, NY (US); Phil F. Chen, Denville, NJ (US); Sherwin J. Wang, Towaco, NJ (US); Eduardo Abreu, Allentown, PA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/148,351

(22) Filed: Jan. 6, 2014

(65) Prior Publication Data

US 2014/0119469 A1     May 1, 2014

Related U.S. Application Data

(63) Continuation of application No. 13/589,511, filed on Aug. 20, 2012, now Pat. No. 8,634,495, which is a continuation of application No. 12/766,725, filed on Apr. 23, 2010, now Pat. No. 8,249,187, which is a (Continued)

(51) Int. Cl.
*H04B 7/06* (2006.01)
*H04W 52/42* (2009.01)

(52) U.S. Cl.
CPC ............ *H04B 7/0682* (2013.01); *H04B 7/0623* (2013.01); *H04W 52/42* (2013.01)

(58) Field of Classification Search
CPC ... H04W 52/08; H04W 52/221; H04W 52/42; H04B 7/0617; H04B 7/0615; H04B 7/0623; H04B 7/0682
See application file for complete search history.

(56) References Cited

U.S. PATENT DOCUMENTS 5,109,390 A     4/1992  Gilhousen et al.
5,577,265 A    11/1996  Wheatley, III
(Continued)

FOREIGN PATENT DOCUMENTS

EP     0 986 139     3/2000
EP     0 999 658     7/2000
(Continued)

OTHER PUBLICATIONS

Derryberry et al., "Transmit Diversity in 3G COMA Systems", Wideband Wireless Access Technologies to Broadband Internet, IEEE Communications Magazine, Apr. 2002, pp. 68-75.
(Continued)

*Primary Examiner* — Sophia Vlahos
(74) *Attorney, Agent, or Firm* — Gottlieb, Rackman & Reisman, PC

(57) ABSTRACT

Communication is performed for a first communication device having a set of antenna elements. A quality-indication signal is received from a second communication device (e.g., a basestation). A complex weighting is calculated based on the quality-indication signal. A pre-transmission signal is modified based on the complex transmit diversity weighting to produce a set of modified-pre-transmission signals, wherein the modifications are symmetric by making approximately half the magnitude of the transmit diversity modification to one signal in a first direction, and approximately half the magnitude of the transmit diversity modification to the other signal in a second direction, opposite the first direction. Each modified pre-transmission signal from the set of modified-pre-transmission signals is uniquely associated with an antenna element from the set of antenna elements. The set of modified-pre-transmission signals is sent from the set of antenna elements to produce a transmitted signal.

5 Claims, 15 Drawing Sheets

Related U.S. Application Data continuation-in-part of application No. 12/010,655, filed on Jan. 28, 2008, now Pat. No. 7,792,207, which is a continuation of application No. 11/711,630, filed on Feb. 28, 2007, now Pat. No. 7,327,801, which is a continuation of application No. 10/141,342, filed on May 9, 2002, now Pat. No. 7,321,636.

(60) Provisional application No. 60/294,290, filed on May 31, 2001, provisional application No. 61/253,428, filed on Oct. 20, 2009, provisional application No. 61/310,192, filed on Mar. 3, 2010, provisional application No. 61/297,898, filed on Jan. 25, 2010, provisional application No. 61/295,971, filed on Jan. 18, 2010.

(56) References Cited

U.S. PATENT DOCUMENTS

| | | |
|---|---|---|
| 5,604,766 A | 2/1997 | Dohi et al. |
| 5,642,353 A | 6/1997 | Roy, III et al. |
| 5,771,022 A | 6/1998 | Vaughan et al. |
| 5,781,845 A | 7/1998 | Dybdal et al. |
| 5,832,044 A | 11/1998 | Sousa et al. |
| 5,832,387 A | 11/1998 | Bae et al. |
| 5,867,478 A | 2/1999 | Baum et al. |
| 5,960,039 A | 9/1999 | Martin et al. |
| 5,982,327 A | 11/1999 | Vook et al. |
| 5,991,330 A | 11/1999 | Dahlman et al. |
| 5,999,826 A | 12/1999 | Whinnett |
| 6,104,983 A | 8/2000 | Nakada |
| 6,137,840 A | 10/2000 | Tiedemann, Jr. et al. |
| 6,141,567 A | 10/2000 | Youssefmir et al. |
| 6,167,039 A | 12/2000 | Karlsson et al. |
| 6,167,286 A | 12/2000 | Ward et al. |
| 6,185,440 B1 | 2/2001 | Barratt et al. |
| 6,195,342 B1 | 2/2001 | Rohani |
| 6,226,509 B1 | 5/2001 | Mole et al. |
| 6,236,363 B1 | 5/2001 | Robbins et al. |
| 6,236,839 B1 | 5/2001 | Gu et al. |
| 6,259,683 B1 | 7/2001 | Sekine et al. |
| 6,266,528 B1 | 7/2001 | Farzaneh |
| 6,304,215 B1 | 10/2001 | Proctor, Jr. et al. |
| 6,307,506 B1 | 10/2001 | Despain |
| 6,317,411 B1 | 11/2001 | Whinnett et al. |
| 6,317,587 B1 | 11/2001 | Tiedemann, Jr. et al. |
| 6,330,294 B1 | 12/2001 | Ansbro et al. |
| 6,343,218 B1 | 1/2002 | Kaneda et al. |
| 6,349,218 B1 | 2/2002 | Nakagawa et al. |
| 6,351,499 B1 | 2/2002 | Paulraj et al. |
| 6,362,781 B1 | 3/2002 | Thomas et al. |
| 6,369,758 B1 | 4/2002 | Zhang |
| 6,392,988 B1 | 5/2002 | Allpress et al. |
| 6,492,942 B1 | 12/2002 | Kezys |
| 6,594,473 B1 | 7/2003 | Dabak et al. |
| 6,636,495 B1 | 10/2003 | Tangemann |
| 6,704,370 B1 | 3/2004 | Chheda et al. |
| 6,745,009 B2 | 6/2004 | Raghothaman |
| 6,748,024 B2 | 6/2004 | Kuchi et al. |
| 6,754,473 B1 | 6/2004 | Choi et al. |
| 6,782,037 B1 | 8/2004 | Krishnamoorthy et al. |
| 6,810,264 B1 | 10/2004 | Park et al. |
| 6,816,557 B2 | 11/2004 | Kuchi et al. |
| 6,859,643 B1 | 2/2005 | Ma |
| 6,882,228 B2 | 4/2005 | Rofougaran |
| 7,149,483 B1 | 12/2006 | Reinisch et al. |
| 7,200,368 B1 | 4/2007 | Hottinen et al. |
| 7,660,598 B2 | 2/2010 | Barnett et al. |
| 7,729,714 B2 | 6/2010 | Black et al. |
| 2001/0005685 A1 | 6/2001 | Nishimori et al. |
| 2001/0020915 A1 | 9/2001 | Proctor, Jr. |
| 2001/0022557 A1 | 9/2001 | Rouphael et al. |
| 2002/0008672 A1 | 1/2002 | Gothard et al. |
| 2002/0021683 A1 | 2/2002 | Holtzman et al. |
| 2002/0058510 A1 | 5/2002 | Mohebbi |
| 2002/0098872 A1 | 7/2002 | Judson |
| 2002/0122465 A1 | 9/2002 | Agee et al. |
| 2002/0145968 A1 | 10/2002 | Zhang et al. |
| 2003/0026219 A1 | 2/2003 | Moon et al. |
| 2003/0109282 A1* | 6/2003 | Shperling et al. .......... 455/561 |
| 2003/0112880 A1 | 6/2003 | Walton et al. |
| 2003/0157954 A1 | 8/2003 | Medvedev et al. |
| 2004/0048584 A1 | 3/2004 | Vaidyanathan et al. |
| 2004/0066754 A1 | 4/2004 | Hottinen |
| 2004/0085239 A1 | 5/2004 | Ukena et al. |
| 2005/0059355 A1 | 3/2005 | Liu |
| 2005/0083875 A1 | 4/2005 | Sato |
| 2005/0130597 A1 | 6/2005 | Li et al. |
| 2005/0143113 A1 | 6/2005 | Lee et al. |
| 2006/0094418 A1 | 5/2006 | Chen et al. |
| 2006/0267983 A1 | 11/2006 | Karmi et al. |

FOREIGN PATENT DOCUMENTS

| | | | |
|---|---|---|---|
| EP | 1 204 217 | 5/2002 | |
| EP | 1 255 369 | 11/2002 | |
| EP | 1 282 242 | 2/2003 | |
| EP | 1 282 244 | 2/2003 | |
| EP | 1 284 545 | 2/2003 | |
| EP | 1 262 031 | 5/2004 | |
| GB | 2 353 437 | * 2/2001 | ......... H04B 7/02 |
| JP | 09-238098 | 9/1997 | |
| JP | 2000-151484 | 5/2000 | |
| WO | 97/24818 | 7/1997 | |
| WO | 00/36764 | 6/2000 | |
| WO | 00/79701 | 12/2000 | |
| WO | 01/69814 | 9/2001 | |
| WO | 02/13493 | 2/2002 | |
| WO | 03/005606 | 1/2003 | |
| WO | 03/073648 | 9/2003 | |
| WO | 03/090386 | 10/2003 | |
| WO | 2004/045108 | 5/2004 | |
| WO | 2005/081444 | 9/2005 | |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

Supplementary Partial European Search Report for Application No. 02 72 5954 dated Sep. 9, 2004.

Japanese Office Action for Application No. 2003-501851 dated Mar. 14, 2007.

International Search Report for Application No. PCT/US2002/014437 dated Oct. 29, 2002.

International Search Report for Application No. PCT/US2006/039400 dated Feb. 2, 2007.

http://www.efunda.com/math/complex_numberslcomplex.clm Mar. 2006.

International Search Report for Application No. PCT/US2002/012978 dated Jul. 23, 2002.

3GPP TS 25.214 v3.4.0, Technical Specification Sep. 2000.

* cited by examiner

SYSTEM, METHOD AND APPARATUS FOR MOBILE TRANSMIT DIVERSITY USING SYMMETRIC PHASE DIFFERENCE

CROSS-REFERENCE TO RELATED APPLICATIONS

This application is a continuation of U.S. patent application Ser. No. 13/589,511 filed Aug. 20, 2010, now U.S. Pat. No. 8,634,495, which is a continuation of U.S. patent application Ser. No. 12/766,725 filed Apr. 23, 2010, now U.S. Pat. No. 8,249,187, which is a continuation in part application of U.S. patent application Ser. No. 12/010,655, filed Jan. 28, 2008, which is a continuation of U.S. patent application Ser. No. 11/711,630, now issued as U.S. Pat. No. 7,327,801, which in turn is a continuation of U.S. patent application Ser. No. 10/141,342, now issued as U.S. Pat. No. 7,321,636 which claims priority from U.S. Provisional Patent Application No. 60/294,290 filed May 31, 2001 which are incorporated in their entirety herein by reference.

In addition, U.S. patent application Ser. No. 12/766,725 filed Apr. 23, 2010, now U.S. Pat. No. 8,249,187, also claims priority from U.S. Provisional Patent Applications Nos. 61/253,428 filed Oct. 20, 2009, 61/295,971 filed Jan. 18, 2010, 61/297,898 filed Jan. 25, 2010, and 61/310,192, filed Mar. 3, 2010 which are incorporated in their entirety herein by reference.

This application also claims benefit of provisional patent application Ser. No. 61/253,428, filed Oct. 20, 2009, provisional patent application Ser. No. 61/295,971, filed Jan. 18, 2010, provisional patent application Ser. No. 61/297,898, filed Jan. 25, 2010, and provisional application Ser. No. 61/310,192, filed Mar. 3, 2010, all of which are incorporated in their entirety by reference herein.

BACKGROUND OF THE INVENTION

The invention relates generally to communications and more particularly to a system and method for using a quality-indication signal added to a transmitted signal in a communication system, and used by the receiving end, in conjunction with multiple antenna elements. The receiver can use a separation process known as spatial filtering, or also referred to herein as smart antenna.

Broadband networks having multiple information channels are subject to certain types of typical problems such as inter-channel interference, a limited bandwidth per information channel, inter-cell interference that limit the maximum number of serviceable users, and other interference. The usage of smart antenna techniques (e.g., using multiple antenna elements for a separation process known as spatial filtering), at both ends of the wireless communications channels, can enhance spectral efficiency, allowing for more users to be served simultaneously over a given frequency band.

Power-control signaling is another technique used to minimize inter-channel interference and increase network capacity. For example, mobile communication standards include a high rate, continuous, power-control signaling to ensure that mobile communication devices do not transmit too much or too little power. More specifically, based on the strength of the signal sent from the communication device and received at the basestation, the basestation sends a power-control signal to the mobile communication device indicating whether the communication device should increase or decrease the total power of its transmitted signal. The transmission rates for each value of the power-control signals are, for example, 1.25 ms for cdmaOne (IS-95)/CDMA2000, and 0.66 ms for WCDMA.

The known uses of power-control signaling have been limited only to adjusting the total power of the signal transmitted from the communication device. Next generation communication devices, however, can use multiple antenna elements (also referred to herein as a "smart antenna") for a separation process known as spatial filtering. Thus, a need exists for an improved system and method that can combine the advantages of power-control signaling with the advantages of smart antennas.

SUMMARY OF THE INVENTION

Wireless transmission systems may use transmit diversity, whereby signals are simultaneously transmitted to a receiver using a plurality of transmit antennas. A transmitting modifying communication device may have multiple antenna elements that transmit signals to communicate information. Multiple antenna elements for transmission may enhance spectral efficiency and capacity, allowing for more users to be simultaneously served over a given frequency band in a given single site and or multiple cells area, and improving coverage, e.g., extending the reach and performance at cell edges, by adding additional transmitting antenna(s) to the UE in such a way that reduces destructive interference between the various UE antennas (experienced at the base station receivers) which are caused by multi-path and fading. According to embodiments of the present invention, the plurality of signals may be transmitted differing by a transmit diversity parameter, e.g., a phase difference, a power ratio, etc.

In mobile transmit diversity devices, communication is performed using a set of antenna elements. A quality-indication signal received from a second communication device (e.g., a basestation) may be used as a feedback signal to adjust the transmit diversity parameter. The quality-indication signal may include one or more power control bits, or reverse power control signal, provided by a base station over the downlink to a mobile terminal as feedback for a transmit diversity parameter or other possible quality indicators originated by the base station. A complex weighting, e.g., one or more transmit diversity parameters, is calculated based on the quality-indication signal. A modulated pre-transmission signal is modified based on the complex weighting to produce a set of modified pre-transmission signals. Each modified pre-transmission signal from the set of modified-pre-transmission signals is uniquely associated with an antenna element from the set of antenna elements. The set of modified pre-transmission signals is sent from the set of antenna elements to produce a transmitted signal. The complex weighting is associated with total power of the transmitted signal and at least one from a phase rotation and a power ratio associated with each antenna element from the set of antenna elements.

According to particular embodiments of the invention, a transmit diversity parameter may be phase difference between a plurality of antennas. That is, a phase difference or phase rotation, between the signals transmitted on the two or more antennas may be adjusted to improve reception at the base station, e.g., increase signal strength and or Quality by constructive combining of the received signals at the base station. However, mobile transmit diversity communication devices and methods must generally be adapted to operate in conjunction with pre-existing receivers, e.g., base stations designed for mobile transmit non-diversity devices and methods. Embodiments of the present invention provide for mobile transmit diversity devices and methods that are compatible with base station communication protocol in a manner as to reduce possible exposure of the base station to excessive environment changes that might deteriorate its channel estimation performance or SIR estimation or the interference cancellation performance as a result of the transmit diversity feature, or receiver equalization.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
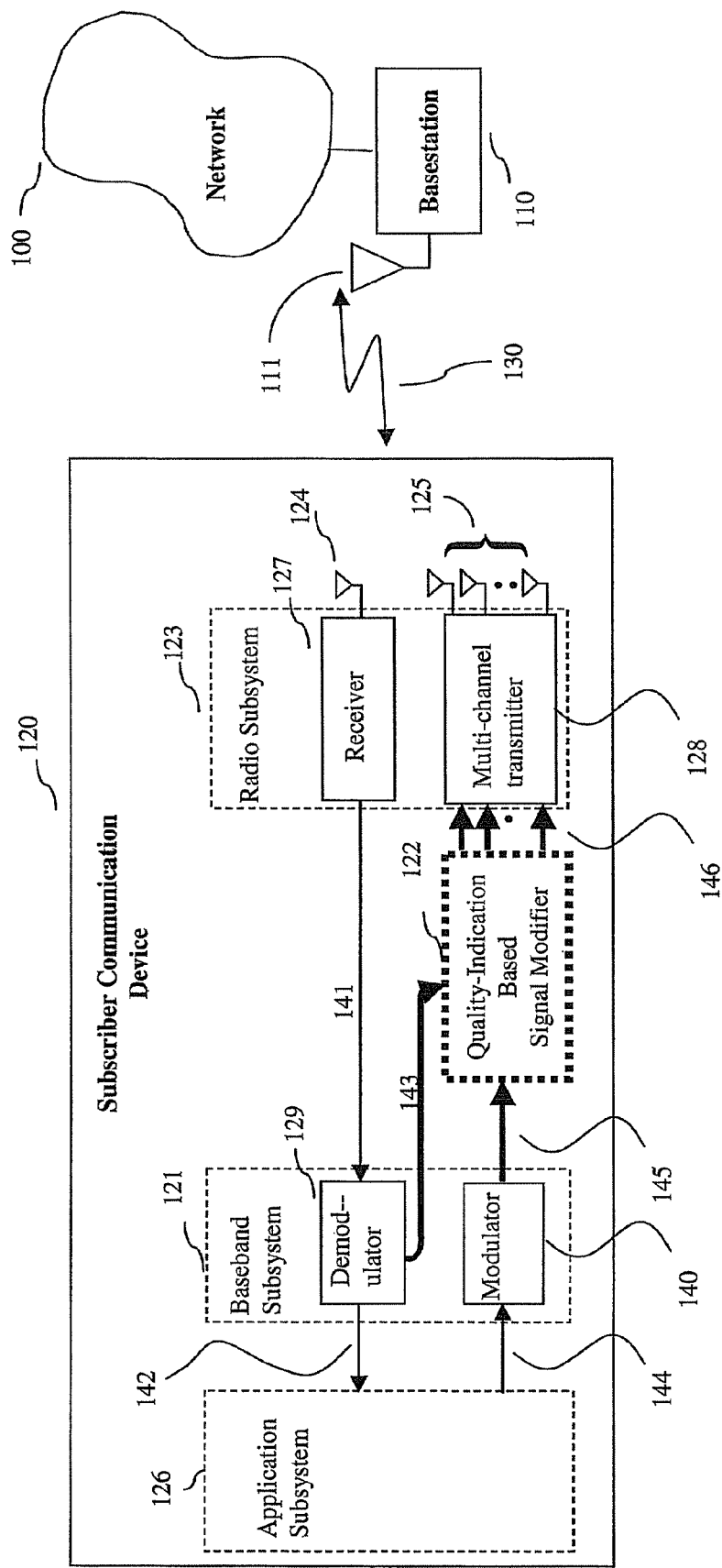
FIG. 1 shows a system block diagram of a communication network according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

A transmitted signal sent from a subscriber communication device (e.g., a mobile communication device, or user equipment (UE)) to a second communication device (e.g., a basestation) can be weakened by time or by propagation-geometry-dependent fading and multipath. In other words, a signal sent from a subscriber communication device to a basestation will undergo destructive interference due to the fact that the transmitted signal propagates along different paths and reaches the basestation as a combination of the signals each having a different phase.

Accordingly, by controlling the phase of the transmitted signal at the subscriber communication device, the combination of signals received at the basestation can be made to constructively interfere rather than destructively interfere, or alternatively reduce the intensity of the destructive interference. The phase of the transmitted signal can be controlled through the use of multiple antenna elements at the subscriber communication device. If the rate at which the transmitted signal is controlled exceeds the rate of fading, then the basestation will receive the transmitted signal at a relatively constant rate of power at a substantially optimized power. Because the rate of fading is relatively slow (e.g., between few Hz and a couple of hundred Hz) compared to the rate of power-control signaling in certain known communication protocols (e.g., around 1000s of Hz), power-control signaling can be used to tune a smart antenna to substantially optimize the transmission of signals from a subscriber communication device to a basestation.

The tuning of the subscriber communication device is done through the use of complex weighting. The signals associated with each antenna element from a set of multiple antenna elements can be adjusted based on the complex weighting. The term "complex weighting" relates to real and imaginary components of a signal, which can be varied to define the magnitude and phase of the signal. Because each of these signals can be adjusted differently, each signal is a low-correlation version of the pre-transmission signal upon which the transmitted signal is based. In other words, the signals associated with each antenna element can be adjusted separately from each other based on the complex weighting so that these signals are a low-correlation version of the pre-transmission signal. The signals transmitted on each antenna differ from others by such complex weighting, which may also be referred to as one or more transmit diversity parameters. A transmit diversity parameter may be a relative phase difference between the signals, relative power ratio between the signals, etc. The complex weighting, e.g., the one or more transmit diversity parameters, may be used to adjust the total power of the transmitted signal and/or the phase rotation and/or power ratio associated with the signal transmitted on each antenna element. The transmit diversity parameter may be determined by a processor, for example, based on one or more quality-indication signals, and applied to the signals transmitted over the plurality of antennas by a vector modulator, as described below.

Note that term "quality-indication signal" is used herein to mean a signal having information about the quality of the communication link between a communication source sending the signal with multiple antenna elements and a communication device receiving the signal. For example, the quality-indication signal can be a power-control signal according to a code-division multiple access (CDMA) protocol. Such a CDMA protocol can be, for example, CDMA-IS-95 A/B, CDMA 2000 1X/RTT, CDMA 2000 3X, CDMA EV-DO, wideband CDMA (WCDMA), third-generation (3G) Universal Mobile Telecommunications System (UMTS) and fourth-generation (LTE UMTS and or WiMAX). In fact, although the embodiments described herein are often in reference to such a power-control signal, any type of quality-indication signal in accordance with any type of communication protocol can be appropriate.

In addition, although the embodiments described herein are in reference to a basestation sending a quality-indication signal to a subscriber communication device having multiple antenna elements, alternative embodiments are possible. For example, in alternative embodiments, a quality-indication signal can be sent from a subscriber communication device to a basestation having multiple antenna elements. Alternatively, a quality-indication signal can be sent from one communication device to another communication device having multiple antenna elements.

FIG. 1 shows a system block diagram of a wireless communication network according to an embodiment of the invention. As shown in FIG. 1, network 100 is coupled to basestation 110, which includes antenna 111. Subscriber communication device 120 is coupled to basestation 110 by, for example, a wireless communication link 130. Subscriber communication device 120 includes baseband subsystem 121, quality-indication based signal modifier 122, radio subsystem 123, receive antenna 124, array of transmit antennas 125, and application subsystem 126, which handles the voice/data/display/keyboard, etc. The baseband subsystem 121 comprises two main portions: a modulator 140 and a demodulator 129. The radio subsystem 123 comprises two main portions: a receiver 127 and a multi-channel transmitter 128.

Baseband subsystem 121, quality-indication based signal modifier 122, the multi-channel transmitter 128, and transmit antenna array 125 are portions of a transmitter for subscriber communication device 120.

Baseband subsystem 121 is the portion of the wireless communications system that receives a modulated received signal 141, demodulates it to produce demodulated received signal 142 and to extract the quality indicator sent from the other side of the wireless link 130. Demodulated received signal 142 is provided to application subsystem 126. The extracted quality indicator is fed into the quality-indication based signal modifier 122 via quality-indication signal 143. Quality-indication based signal modifier 122 modifies the pre-transmission signal 145 in such a way that the other side of the wireless link 130 (e.g., basestation 110), undergoes improved reception without necessarily increasing the combined power level transmitted from the subscriber communication device 120. Rather, by manipulating the weights of the various power amplifiers that feed their respective antenna elements in the array of transmit antennas 125, better multipath behavior is achieved at the other side of the wireless link 130 (e.g., at basestation 110), as explained in further detail below. Said another way, application subsystem 126 receives information for transmission such as, for example, data and/or voice information. Application subsystem 126 sends an unmodulated transmission signal 144 to modulator 140 of baseband subsystem 121. Modulator 140 modulates unmodulated transmission signal 144 to produce pre-transmission signal 145, which is provided to quality-indication signal modifier 122. Quality-indication signal modifier calculates a complex weighting based on the quality-indication signal 143 and modifies the pre-transmission signal to produce a plurality of modified pre-transmission signals 146. Each modified pre-transmission signal is uniquely associated with an antenna element from the array of transmit antennas 145. The modified pre-transmission signal 146 is sent to multi-channel transmitter 128, which forwards the modified pre-transmission signals 146 to the array of transmit antennas 125. The array of transmit antennas 125 sends an effective combined transmitted signal based on the modified pre-transmission signal 146.

Figure 2:
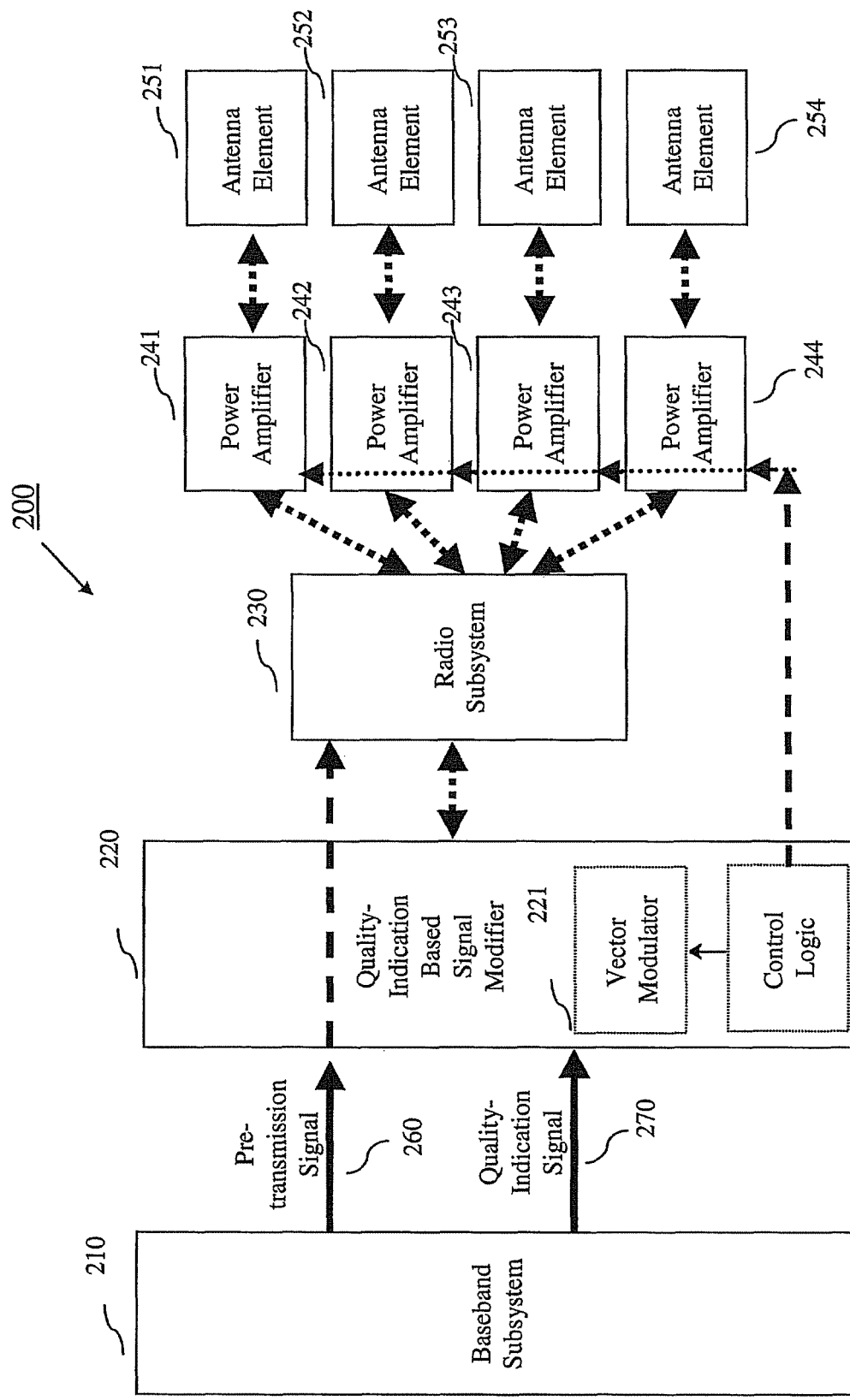
FIG. 2 shows a system block diagram of a transmitter for the subscriber communication device shown in FIG. 1.

FIG. 2 shows a system block diagram of a transmitter for the subscriber communication device shown in FIG. 1. The transmitter system 200 includes baseband subsystem 210, quality-indication based signal modifier 220, radio subsystem 230, power amplifiers 241, 242, 243 and 244, and antenna elements 251, 252, 253 and 254. Baseband subsystem 210, quality-indication based signal modifier 220, radio subsystem 230, antenna elements 251, 252, 253 and 254, correspond to baseband subsystem 121, quality-indication based signal modifier 122, radio subsystem 123, and transmit antenna array 125, shown in FIG. 1.

Note that although the subscriber communication device is shown FIG. 2 as having four antenna elements 251 through 254 and four corresponding power amplifiers 241 and 244, any number of two or more antenna elements (and corresponding power amplifiers) is possible. Thus, it will be understood that although the subscriber communication device is described herein as having four antenna elements, other embodiments can have any number of two or more antenna elements.

Baseband subsystem 210 is coupled to quality-indication based signal modifier 220 and sends a pre-transmission signal 260 and a quality-indication signal 270. Quality-indication based signal modifier 220 includes vector modulator 221 and control logic 222. Quality-indication signal modifier 220 is coupled to radio subsystem 230 and power amplifiers 241 through 244. More specifically, quality-indication based signal modifier 220 provides modified pre-transmission signals to radio subsystem 230. Control logic 222 of quality-indication based signal modifier 220 provides complex weighting to vector modulator 221 and power amplifiers 241 through 244, as described below in further detail.

Radio subsystem 230 receives the modified pre-transmission signal from quality-indication based signal modifier 220. The modified pre-transmission signal can be, for example either baseband signals, IF signals, or RF signals. Radio subsystem 230 converts the received pre-transmission signal into radio frequency (RF) signals, which are provided to power amplifiers 241 through 244.

Power amplifiers 241 through 244 each receive RF modified pre-transmission signals and amplify those signals for transmission. Power amplifiers 241 through 244 are coupled to antenna elements 251 through 254, respectively. Power amplifiers 241 through 244 provide the amplified signals to antenna elements 251 through 254, each of which sends its respective RF modified pre-transmission signal to produce a transmitted signal. In other words, each antenna element 251 through 254 sends a respective signal component all of which form a transmitted signal.

Figure 3:
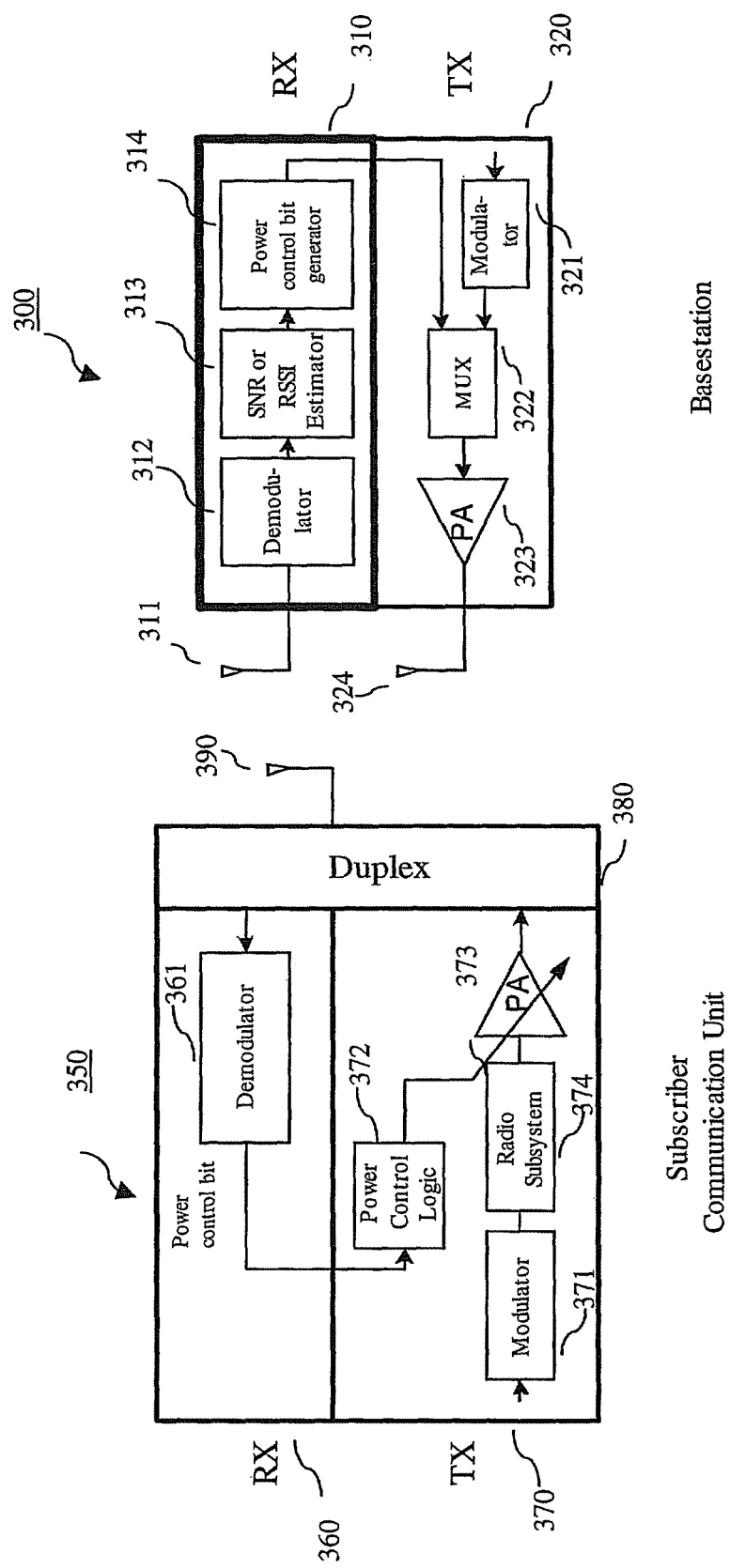
FIG. 3 shows a system block diagram of a basestation and subscriber communication device according to a known system.

FIG. 3 shows a system block diagram of a basestation and subscriber communication device according to a known system. This is helpful for understanding how prior CDMA basestation systems employ a power-control signal to adjust the transmit power of the subscriber communication device.

In FIG. 3, basestation 300 includes receiver (Rx) 310 and transmitter (Tx) 320. Receiver 310 includes demodulator 312, signal-to-noise ratio (SNR) or RSSI (RF Signal Strength Indicator) estimator 313 and power control bit generator 314. Receiver 310 is coupled to antenna 311. Transmitter 320 includes modulator 321, multiplexer 322 and power amplifier (PA) 323. Transmitter 320 is coupled to antenna 324.

Subscriber communication unit 350 includes receiver 360, transmitter 370, duplexer/diplexer 380 and antenna 390. Duplexer/diplexer 380 can comprise a filter separating different bands like cellular service versus Personal Communication Service (PCS), and/or separation of receive/transmit; typically, duplexer/diplexer 380 has one port connected to one antenna, and other port connected to various radio circuitries that operate either simultaneously or alternatively. Receiver 360 includes demodulator 361. Transmitter 370 includes modulator 371, power control logic 372, power amplifier (PA) 373 and radio subsystem 374.

Antenna 311 at the basestation receiver 310 is coupled to demodulator 312, which is in turn coupled to SNR or RSSI estimator 313. SNR or RSSI estimator 313 is coupled to power control bit generator 314, which is in turn coupled to multiplexer 322. Multiplexer 322 is also coupled to modulator 321 and power amplifier (PA) 323, which is in turn coupled to antenna 324.

Antenna 390 at the receiver 360 of subscriber communication device 350 is coupled to duplexer/diplexer 380. Duplexer/diplexer 380 relays received signals from antenna 390 to receiver 360 and relays signals sent from transmitter 370 to antenna 390. More specifically, duplexer/diplexer 380 is coupled to demodulator 361, which is coupled to power control logic 372.

Turning to the transmitter 370, modulator 371 receives the pre-transmission signal for transmission and provides it to radio subsystem 374. Radio subsystem 374 converts the pre-transmission signal into a RF signals, and forwards it to power amplifier 373. Power amplifier 373 is also coupled to power-control logic 372, which provides power-control information. More specifically, the received signals include a quality-indication signal such as, for example, a power-control signal having one or more power-control bits. These power-control bits indicate the manner in which the subscriber communication device should modify the total power of the transmitted signal. The power control indication is originally generated at the other side of the wireless communications link (e.g., basestation 300), and is sent back to the subscriber communication unit 350 to obtain improved signal quality in such a way that will produce reduced interference. These power-control bits are provided to power amplifier 373, which adjusts the total power for the transmitted signal based on the power-control bits. Power amplifier 373 is coupled to duplexer/diplexer 380, which forwards the amplified pre-transmission signal to antenna element 390 for transmission.

Note that in the known subscriber communication device 350, the power control logic 372 provides information based on the received power control bit to power amplifier 373. The only adjustment to the transmit signal is an adjustment to the power amplifier output level.

Figure 4:
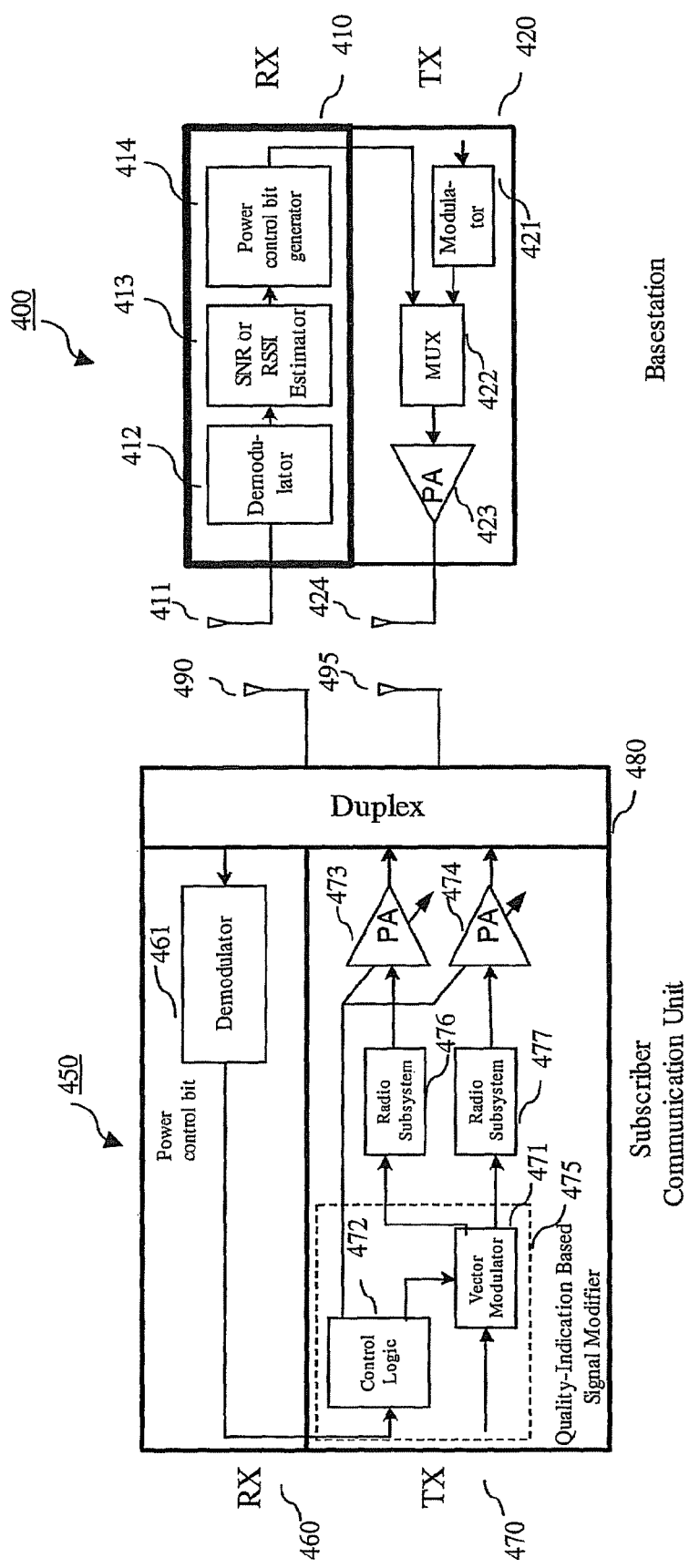
FIG. 4 shows a system block diagram of a basestation and a subscriber communication device having two transmitting antennas, according to an embodiment of the invention.

FIG. 4 shows a system block diagram of a basestation and subscriber communication device according to an embodiment of the invention. Basestation 400 includes a receiver (Rx) 410 and transmitter (Tx) 420. Receiver 410 includes antenna 411, demodulator 412, SNR or RSSI estimator 413 and power control bit generator 414. Transmitter 420 includes modulator 421, multiplexer 422, power amplifier (PA) 423 and antenna 424.

Subscriber communication unit 450 includes receiver 460, transmitter (Tx) 470, dual duplexer/diplexer 480 and antennas 490 and 495. Dual duplexer/diplexer 480 is, for example, a set of two units, each comprising a duplexer/diplexer. Receiver 460 includes demodulator 461. Transmitter 470 includes quality-indication based signal modifier 475, which includes vector modulator 471 and power control logic 472. Transmitter 470 also includes radio subsystems 476 and 477, and power amplifiers 473 and 474.

Antenna 411 at the basestation receiver 410 is coupled to demodulator 412, which is in turn coupled to SNR estimator 413. SNR or RSSI estimator 413 is coupled to power control bit generator 414, which is in turn coupled to multiplexer 422. Multiplexer 422 is also coupled to modulator 421 and power amplifier 423, which is in turn coupled to antenna 424.

Subscriber communication unit 450 includes antennas 490 and 495 that are used for both reception and transmission, and are coupled to dual duplexer/diplexer 480. Dual duplexer/diplexer 480 is coupled to receiver 460 and transmitter 470. Note that for the purpose of this embodiment, the receiver may use only one of the two antennas 490 and 495, or a combination of them. Receiver 460 includes demodulator 461, which is coupled to control logic 472 of quality-indication based signal modifier 475. Control logic 472 is coupled to vector modulator 471 of quality-indication based signal modifier 475. Vector modulator 471 is coupled to radio subsystems 476 and 477, which are coupled to power amplifiers 473 and 474, respectively. Power amplifiers 473 and 474 are also coupled to control logic 472. In addition, power amplifiers 473 and 474 are coupled to antenna elements 490 and 495, respectively, through dual duplexer/diplexer 480.

Demodulator 461 receives signals from antennas 490 and 495 via the dual duplexer/diplexer 480 to produce a quality-indication signal. This quality-indication signal can be, for example, a power-control signal having one or more power-control bits. This quality-indication signal is provided to control logic 472. Note that demodulator 461 performs other functions and produces other signals, which are not shown in FIG. 4 for the purpose of clarity in the figure. Control logic 472 produces complex weighting values and forwards these complex weighting values to vector modulator 471 and power amplifiers 473 and 474. Power amplifier 473 is associated with antenna element 490 and power amplifier 474 is associated with antenna element 495.

Note that the control logic 472 is different from the power control logic 372 of the known subscriber communication device 350 shown in FIG. 3. The power control logic 372 merely provided power control information to power amplifier 373, whereas the control logic 472 shown in FIG. 4 provides complex weighting to both the vector modulator 471 and the set of power amplifiers 473 and 474. This allows not only the total power of the transmitted signal to be adjusted based on the received power-control bit, but in addition, allows the phase rotation and/or the power ratio associated with each antenna element 490 and 495 to be adjusted based on the received power control information. Accordingly, this allows the transmitted signal to be optimal with respect to its reception by basestation 400. Once this optimized signal is received by basestation 400, basestation 400 can then send a power-control signal to subscriber communication device 450 indicating that subscriber communication 450 should adjust the total power of its transmitted signal. Consequently, by optimizing the transmitted signal, the total power of the transmitted signal can be reduced, versus the case of a communication device with a single antenna, as described in FIG. 3. Such an optimization beneficially allows, for example, an increase in the battery lifetime of subscriber communication unit 450, an increase in the cellular system capacity of the communication network, and a decrease in the radiation hazard to the user of the subscriber communication unit 450.

The complex weighting provided by control logic 472 can be based on the total power of the transmitted signal and one or both of the phase rotation and the power ratio associated with each antenna element 490 and 495.

Figure 5:
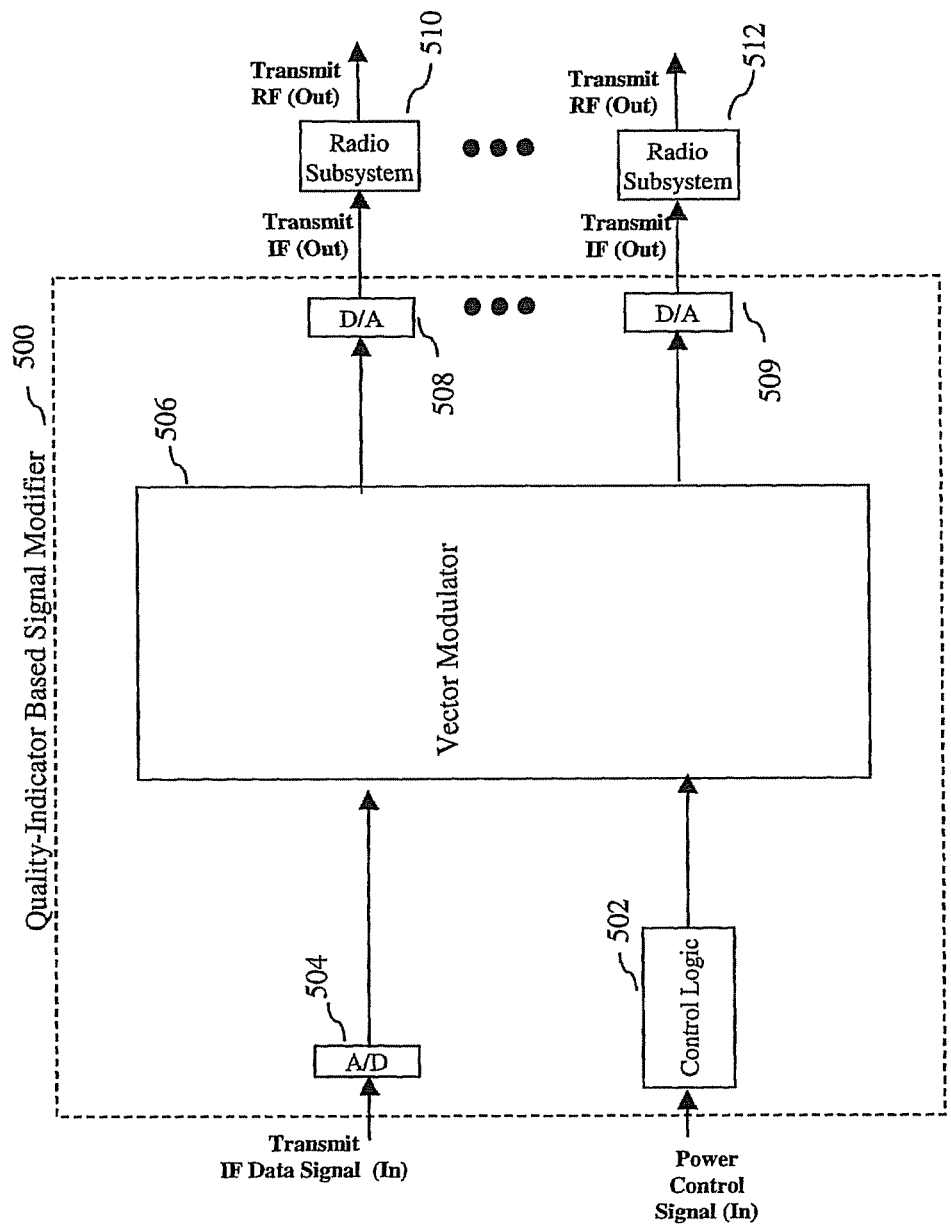
FIG. 5 illustrations a portion of the transmitter system for subscriber communication device, according to another embodiment of the invention.

FIG. 5 illustrates a portion of the transmitter system for subscriber communication device, according to another embodiment of the invention. Quality-indicator based signal modifier 500 includes control logic 502, analog-to-digital (A/D) converter 504, vector modulator 506 and digital-to-analog (D/A) converters 508 through 509. D/A converter 508 is coupled to radio subsystem 510 and D/A converter 509 is coupled to radio subsystem 512.

Note that the D/A converters and radio subsystems are repeated for a number that corresponds to the number of antenna elements. In other words, if subscriber communication device has N number of antenna elements, then the subscriber communication device has N number of D/A converters and radio subsystems. Thus, as shown in FIG. 5, D/A converter 508 and radio subsystem 510 are associated with one antenna element from a set of antenna elements (not shown in FIG. 5). D/A converter 509 and radio subsystem 512 are associated with a different antenna element from the set of antenna elements. Any remaining antenna elements from the set of antenna elements are each also uniquely associated with a D/A converter and a radio subsystem.

The quality-indicator based signal modifier 500 receives an IF pre-transmission signal and power-control signal. The IF pre-transmission signal is received by A/D converter 504, which converts the analog pre-transmission signal to a digital form. The A/D converter 504 forwards the digital pre-transmission signal to vector modulator 506. The power control signal is received by control logic 502, which determines complex weighting values.

The complex weighting is calculated by determining the appropriate weighting value associated with the in-phase signal component and the quadrature signal component associated with each antenna element. For example, in the case where the phase rotation is being adjusted, the weighting value for the in-phase signal component will be different than the weighting value for the quadrature signal component. In the case where the power ratio is being adjusted, the weighting value for the in-phase signal component and the weighting value for the quadrature signal component are simultaneously increased or decreased for a given antenna element in parallel. Finally, in the case where the total power of the transmitted signal is being adjusted, the weighting value for the in-phase signal component and the weighting value for the quadrature signal component are simultaneously increased or decreased for all of the antenna elements in parallel.

Control logic 502 provides the complex weighting values to vector modulator 506. Vector modulator 506 receives the digital pre-transmission signal from A/D converter 504 and the complex weighting values from control logic 502. Vector modulator 506 splits the pre-transmission signal into a number of pre-transmission signals corresponding to the number of antenna elements. The vector modulator 506 then applies the complex weighting to the various pre-transmission signals so that each pre-transmission signal, which uniquely corresponds to an antenna element, modifies the respective pre-transmission signal based on the complex weighting values. The modified pre-transmission signals are then provided to D/A converters 508 through 509, which convert the pre-transmission signal from digital to analog form. Those pre-transmission signals are then provided to radio subsystems 510 through 512, respectively, which then convert the IF form of the pre-transmission signals into an RF form. These signals are then forwarded to power amplifiers and respective antenna elements (not shown in FIG. 5).

It will be recalled that the base station may perceive the transmissions as a single combined signal. That is, the base station may receive the two or more transmit diversity signals as a single signal having an amplitude and phase. The characteristics of the combined transmit diversity signals as received by the base station are referred to herein as the perceived characteristics. Thus, for example, the mobile transmit diversity communication device may transmit first and second signals with a phase difference therebetween. These first and second signals may be perceived at the base station as a combined signal having a perceived phase and a perceived amplitude. Moreover, the paths of the signals transmitted by the antennas of the mobile communication device respectively, may be subject to different fading e.g., different complex path-loss. Thus, the signal transmitted by one antenna may arrive at the base station with a first phase shift, and the signal transmitted by another antenna may arrive at the base station with a second phase shift, different from the first phase shift. Thus, the phase and amplitude difference between the signals transmitted by the antennas may not be (and typically is not) identical to the phase and amplitude difference between the transmitted signals as perceived at the base station. When received as a perceived combined signal at the base station, therefore, the transmitted signals may combine constructively or destructively. This self interference operating on the signals transmitted by the mobile unit's antennas may not be known a priori, and is not typically measurable by a base station. Therefore, embodiments of the present invention may use a gradient-seeking perturbation method, as described herein in a number of variations, in order to determine an optimal phase difference between the transmission signals, such that when received, the signals combine constructively.

According to an embodiment of the invention, the processor or control logic of the mobile communication device may output one or more parameters to modify a pre-transmission signal by adjusting a nominal value of a transmit diversity parameter differentiating a first signal to be transmitted on a first antenna from a second signal to be transmitted on a second antenna. As described more fully herein, according to an embodiment of the invention, modulation of a transmit diversity parameter during a perturbation cycle may comprise transmitting using a transmit diversity parameter deviating from the nominal value in a first direction during a first portion of the perturbation cycle and then transmitting using a transmit diversity parameter deviating from the nominal value in a second direction during a second portion of the perturbation cycle. Variations are possible, for example, there may be a number of consecutive perturbations in a first direction over a number of slots, followed by a number of consecutive perturbations in a second direction over a number of slots. In another variation, the mobile unit may change the transmit diversity parameter based on a sequence of quality indicator feedback signals, etc. Other methods of varying a transmit diversity parameter are possible within the scope of the present invention.

According to one embodiment of operation of the invention, the mobile communication device may modify a signal by perturbing the signal. Perturbing a signal may refer to modulating a signal feature of the signal in relation to a nominal value of the signal, for example, modifying the signal feature in a first direction for a first feedback interval, and in a second direction for another feedback interval. A perturbation cycle may refer to a first modulation in a first direction and a second modulation in a second direction. In some embodiments of the invention, a perturbation cycle may comprise a different, e.g., longer or more complex, sequence of modulations. As an example with respect to an embodiment of the invention in which the transmit diversity parameter is relative phrase rotation, or phase difference, a perturbation may include modulating the phase difference in a first direction, and modulating the phase difference in a second direction. If the feedback information provided by the feedback communication device, e.g., base station, indicates an improvement in the signal received using one perturbation modulation direction compared to the signal received using the other perturbation modulation direction, the next nominal value adjustment may be made in the improved direction in an amount that may be less than or equal to the modulation.

The signals transmitted by the antennas of the mobile station each have an amplitude and a phase. Accordingly, the signals may be schematically depicted as vectors having a positive scalar amplitude and a direction, or phase. For purposes of schematic simplicity, the phase may be regarded as an angle of the signal vector from the x-axis. Thus, as described above, the signal vectors, e.g., amplitude and phase, of the transmit signals may be known at the point of transmission, but the mobile unit does not typically have access to either a priori (e.g., theoretically calculated) or measured phase difference as perceived by the base station. Rather, the base station provides a signal-quality indicator based on the combined signal. It is an object of the mobile devices and methods employed thereby according to embodiments of the present invention to calculate a transmit diversity parameter that when applied allows transmit signals to be perceived at the base station as having substantially no phase difference or at least to reduce the component of the perceived phase difference, created by the phase change of the mobile device, thereby allowing the signals to combine constructively, in such a way that causes the base station to substantially perceive a different amplitude, with little or no perceived phase change. Conversely, it will be understood that a phase difference of 180° as perceived at the base station is to be avoided or its occurrence should be minimized, insofar as this may cause the signals transmitted by the antennas to destructively interfere, thereby causing the base station to perceive a weak or noisy signal.

It will be recognized that embodiments of the present invention may also be applicable for base stations that provide any sort of signal quality feedback. For example, a base station may provide a mobile unit with more detailed information than simply a single-bit POWER UP or POWER DOWN signal; for example, a base station may propose to the mobile unit a recommended next transmit diversity parameter. In such cases, the symmetric change of phase difference of the present invention may still apply. Thus, for example, where the base station may request a particular change in phase difference, the mobile unit may implement such change in phase difference symmetrically over the antenna paths.

Figure 6A:
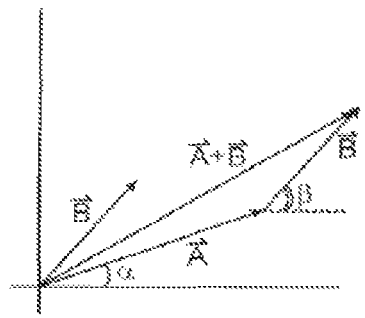
FIGS. 6A-6E are schematic figures illustrating transmit diversity signals as received at a base station according to embodiments of the invention.

FIG. 6A is a schematic diagram of illustrative vectors symbolizing the transmit signals being perceived as combined at the base station. Thus, signal vectors A and B represent the signals transmitted by antennas A and B, respectively, as received at the base station, each with a respective amplitude (|A| and |B|) and phase ($\alpha$ and $\beta$). Known vector operations may be applied to obtain the amplitude (magnitude) and phase (angle) of the resultant signal (vector).

By placing the vectors head-to-tail, it will be apparent that the amplitude of the resultant vector has a maximum value when the phase of A (as perceived at the base station) equals the phase of B (as perceived at the base station), i.e., when the perceived phase difference approaches zero. Therefore, the perturbation schemes described herein are intended to systematically attempt various phase differences and obtain feedback from the base station to determine whether the perceived effect of such changes in phase difference is to improve or deteriorate a signal quality indicator (e.g., signal power as perceived by the base station receiver or the combination of active base stations). Where the signal quality indicator indicates improvement in signal quality, it is inferred that the change caused the perceived phase difference to decrease, and where the signal quality indicator indicates deterioration in signal quality, it is inferred that the change caused the perceived phase difference to increase.

The feedback communication device, e.g., the base station, however, may keep track of certain receive parameters of signals received from the modifying communication device, e.g., the mobile transmit diversity device, for example, for purposes of channel estimation, SIR estimation, and/or interference cancellation. One such parameter that may be tracked by the base station may be the phase of the received (combined) signal as perceived by the base station.

The base station may record a number of such receive parameters over the course of a plurality of slots, in order to detect and possibly anticipate a trend in the receive signal. Abrupt or immediate changes of signal phase perceived by the base station may be disruptive to the operation of the base station. Therefore, changes of a transmit diversity parameter, particularly a phase difference, made in order to improve receive signal quality may have the side-effect of disrupting continuity perceived by the base station, for example, by causing an abrupt or immediate change in perceived phase of the receive signal, even if the perceived phase difference is decreased.

Figure 6B:
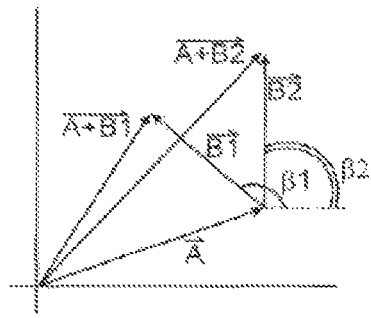

FIG. 6B depicts a signal A transmitted by a first antenna, and signals B1 and B2 transmitted in subsequent transmissions by a second antenna, where the phase of signal B1 is $\beta1$ and the phase of signal B2 is $\beta2$. The magnitude of the combined vector A+B2 is greater than the combined vector A+B1. However, the base station will perceive a change in the phase of the perceived signal, and may disrupt continuity at the base station.

According to embodiments of the present invention, potential negative impact on the base station due to changes in perceived phase may be reduced. In some embodiments of the invention, the modification in a transmit diversity parameter may be implemented in such a way as to reduce or minimize disruption in continuity of perceived receive signal phase.

As described herein, in some embodiments of the invention, particularly in a mobile transmit diversity device having two antennas, phase changes may be applied for an offset mechanism as well as for implementing a step in the current nominal or center phase value, where the phase may be perturbated monotonously and continuously back and forth, swinging in fixed values and alternating signs sequence, identifying a preferred direction, and modifying the center phase value accordingly, thus promoting a gradient-seeking process. In accordance with the present invention, such phase changes may be implemented in such a way as to reduce or minimize disruption in continuity of perceived phase of the receive signal.

In some embodiments of the invention, modification of a transmit diversity parameter may be performed symmetrically, that is, by modifying a parameter of a first transmit signal in a first direction, while simultaneously modifying a parameter of a second transmit signal in a second direction, such that there is little or no perceived effect at the base station.

For example, in the case of phase difference, the phase of the first and second signals may be adjusted by applying modifications to each of the plurality of antennas, rather than solely to one of the signals. More particularly, according to some embodiments of the invention, in order to achieve a particular phase difference, the phase of the first signal may be adjusted in approximately half the desired phase difference in a first direction (e.g., positive), the phase of the second signal may be adjusted in approximately half the desired phase difference in a second direction (e.g., negative), opposite to the first direction. The perceived phase effect of the applied transmit diversity phase difference may thereby be minimized or even eliminated, for example, in cases where the power levels of the two transmitting antennas are perceived as equal by the base station receiver.

In some embodiments of the invention, for example, if a phase change of $\Delta\phi$ is desired, then the signal transmitted on one antenna branch may be modified by $\Delta\phi/2$, while the signal transmitted on another antenna may be modified by $-\Delta\phi/2$, thus effecting a full $\Delta\phi$ phase change, while reducing or eliminating phase change as perceived by the base station. Next, in some embodiments of the invention, this will be followed by reversal of the branches, i.e., the branch that was previously modified by $\Delta\phi/2$ will then be modified by $\Delta\phi$ to $-\Delta\phi/2$, and the other branch that was previously modified by $-\Delta\phi/2$ will then be modified by $\Delta\phi$ to $\Delta\phi/2$. Accordingly, a phase difference of $\Delta\phi$ between the two branches is achieved, thereby perturbing the transmit diversity parameter, thereby to obtain feedback information, while reducing or minimizing the perceived phase change from a previous perceived phase at the base station. It will be recognized that such a reversal may repeat every time phase change is applied.

Figure 6C:
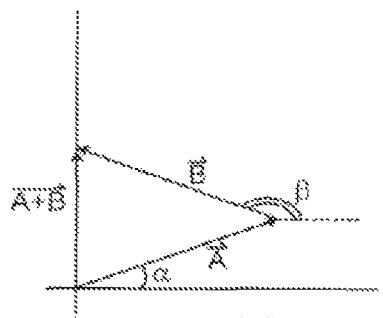
Figure 6D:
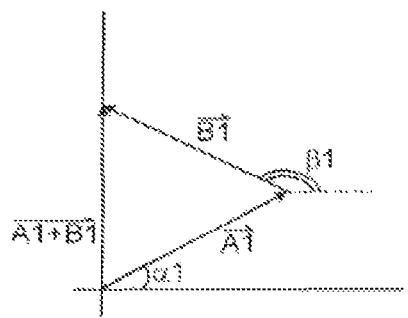
Figure 6E:
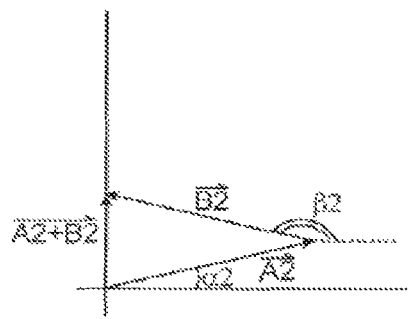

An illustration of an embodiment of the present invention is depicted in FIGS. 6C, 6D, and 6E. FIG. 6C depicts two signals A and B, transmitted with a particular arbitrary phase difference. The signals are each received at a respective phase ($\alpha$ and $\beta$, respectively), resulting in a received phase difference, which may typically be different than the transmitted phase difference. For purposes of illustration, the magnitudes of signals A and B, as received at the base station is assumed to be approximately equal.

In a first perturbation, shown in FIG. 6D, the phase difference of the signals is decreased symmetrically by offset or increment $\Delta\phi$. In particular, signal A is transmitted at phase $\alpha+\Delta\phi/2$, and signal B is transmitted at phase $\beta-\Delta\phi/2$. Thus, the phase of the combined signal as perceived by the base station difference as perceived by the base station is identical in FIGS. 6C and 6D; however, the amplitude of the combined signal has changed. In the depicted example, the combined amplitude, or strength, of the combined signal has increased, which may result in an improved signal quality indicator being sent to the mobile station.

In a second perturbation, shown in FIG. 6E, the phase difference of the signals is increased symmetrically by an offset or increment $\Delta\phi$. In particular, signal A is transmitted at phase $\alpha-\Delta\phi/2$, and signal B is transmitted at phase $\beta+\Delta\phi/2$. Thus, the phase of the combined signal as perceived by the base station difference as perceived by the base station is identical in FIGS. 6C and 6E; however, the amplitude of the combined signal has changed. In the depicted example, the combined amplitude, or strength, of the combined signal has decreased, which may result in a deteriorated signal quality indicator being sent to the mobile station.

Accordingly, embodiments of the present invention may apply symmetric phase changes, e.g., offsets or increments, to the signals transmitted on the antennas, such that when equally added, the resultant sum of these phase changes will be small or zero. Such a summation may therefore create a perceived amplitude change at the base station, with little or no perceived phase change, thereby reducing or minimizing disruption in continuity of perceived receive signal phase at the base station. The same mechanism may be applied to phase steps, e.g., when the algorithm derives from the monotonic perturbations a decision to step the center phase up or down (towards a preferred calculated direction).

In some embodiments of the invention, the transmit antennas may have different efficiencies, which may result in unequal combining. Accordingly, when the two transmit signals are combined unequally, the amplitude change may be accompanied by a phase change as well, in proportion to the efficiencies ratio of the antennas. Thus, for instance, according to embodiments of the invention, when the efficiencies of the antennas are not equal, then symmetry may be calculated based on a variation of the above, which may take into account the different efficiencies. Thus, a proration similar to the average power imbalance may be applied to the ratio between the phase change of one branch and the phase change of the other branch. For example:

$$\sin\Delta\phi_2 = -\sin\Delta\phi_1 \left[\frac{\eta_1}{\eta_2}\right],$$

where $\eta 1$ represents the efficiency of the first antenna, and $\eta 2$ represents the efficiency of the second antenna. Accordingly, the combined complex vector will remain small or zero, and the phase change will be perceived as small or none at the base station. A similar calculation may be performed where the signals are transmitted with different power by the respective antennas, e.g., where the power ratio is greater than or less than unity in inverse proportion to the antennas' respective inefficiencies.

In some embodiments of the invention, a phase difference $\Delta\phi$ may be a combination of an offset (referred as "$\delta$"), which may be a perturbation mechanism, e.g., a systematic and monotonous equal amplitude and opposing signs that swing back and forth, and an optional step size (referred as "$\phi$"), which is a change that is added to one branch only from time to time, per the algorithm decision making process. The algorithm decision may result in one of the following six possible phase changes: $\pm\delta$, or $\pm\delta\pm\phi$, i.e., $\{\delta, -\delta, \delta+\phi, \delta-\phi, -\delta+\phi, -\delta-\phi\}$. This phase difference may be divided between the branches as $\delta/2$ on one branch, and $-\delta/2$ or $-\delta/2\pm\phi$ on the other branch. Thus, for example, if the phase difference is $\delta-\phi$, one branch may be modified by $\delta/2$, while the second branch arm may be modified by $-\delta/2\pm\phi$. In another embodiment of the invention, the phase difference maybe divided equally, particularly where the antennas have equal efficiencies. In the event the antennas have different efficiencies, the phase difference may be divided as provided by the above equation.

Figure 6F:
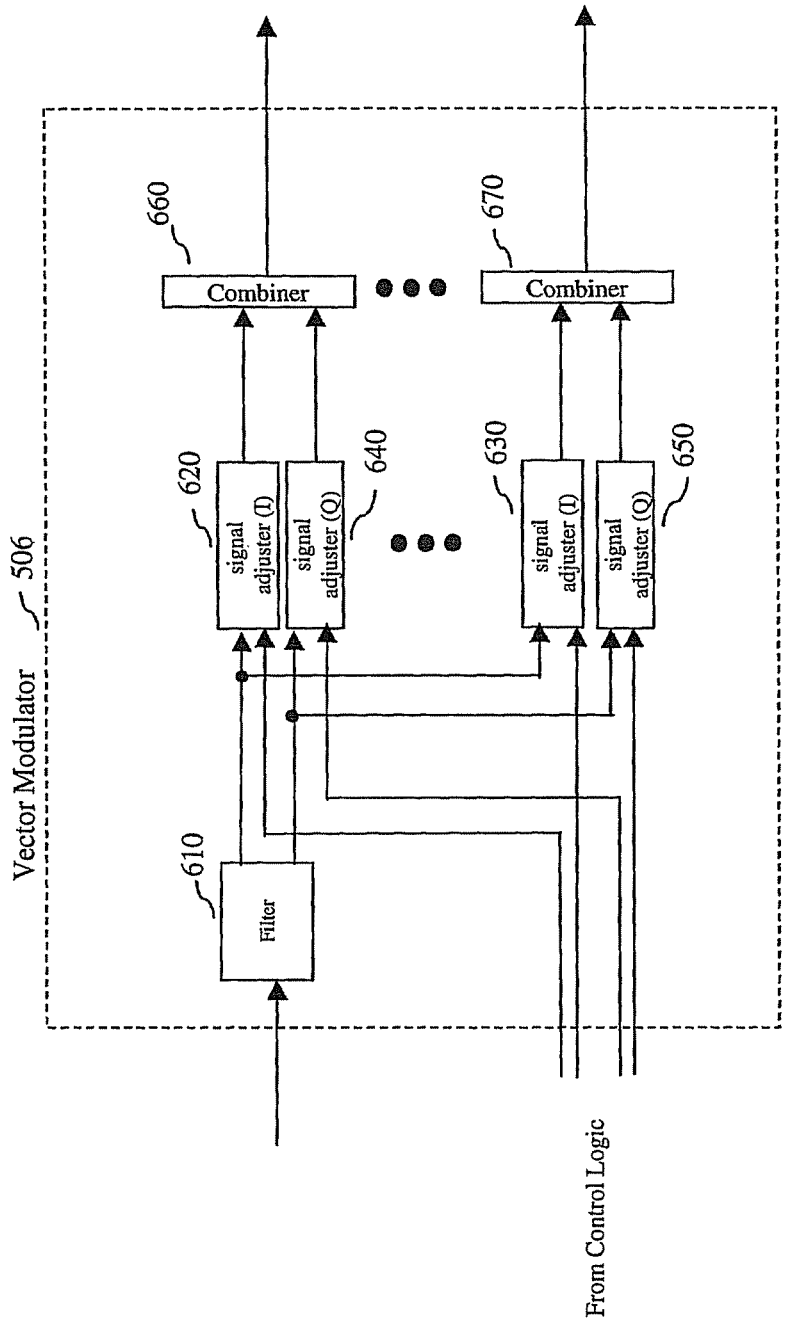
FIGS. 6F-6G show schematic examples of an apparatus including a vector modulator according to embodiments of the invention.

FIG. 6F shows a system block diagram of an embodiment of vector modulator shown in FIG. 5. Vector modulator 506 includes filter 610, in-phase signal adjusters 620 through 630, quadrature signal adjusters 640 through 650, and combiners 660 through 670.

The in-phase signal adjuster 620, the quadrature signal adjustor 640 and the combiner 660 are all uniquely associated with an antenna element from the set of antenna elements (not shown in FIG. 6F). This set of components is repeated within vector modulator 506 corresponding to the number of remaining antenna elements for the subscriber communication device. Thus, as shown in FIG. 6, in-phase signal adjuster 630, quadrature signal adjuster 650 and combiner 670 are also shown for another antenna element of the subscriber communication device.

Filter 610 receives the digital pre-transmission signal from A/D converter 504. Filter 610 divides the received pre-transmission signal into in-phase and quadrature components. The in-phase component of the pre-transmission signal is provided to in-phase signal adjusters 620 through 630. The quadrature component of the pre-transmission signal is provided to quadrature signal adjusters 640 through 650. In-phase signal adjusters 620 through 630 and quadrature signal adjusters 640 through 650 receive complex weighting values from control logic 502. In-phase signal adjusters 620 through 630 and quadrature signal adjusters 640 through 650 apply the complex weighting to the pre-transmission signal components to produce modified pre-transmission signals. In-phase signal adjusters 620 through 630 and quadrature signal adjusters 640 through 650 provide modified pre-transmission signals to combiners 660 and 670, respectively. Combiners 660 and 670 then add the respective modified pre-transmission signals and forward the added signals to D/A converters 508 and 509, respectively.

Figure 6G:
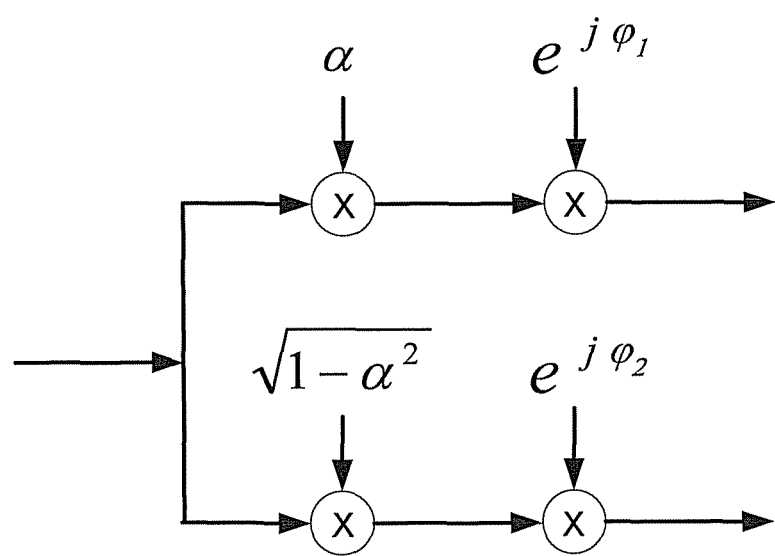

FIG. 6G depicts a schematic illustration of a symmetric vector modulator for producing symmetric changes in phase difference between signals on at least two antennas. A pre-transmission signal is input to the vector modulator at the input node 675. The pre-transmission signal may be split into at least two branches, one for each transmission antenna path. In one path, the amplitude of the signal is modified by amplification factor a, and the phase of the signal modified by $e^{j\phi_1}$. In a second path, the amplitude of the signal is modified by amplification factor $\sqrt{(1-a^2)}$, and the phase of the signal modified by $e^{j\phi_2}$. Assuming the amplitudes of the transmitted signals are equal, i.e., $a=1/\sqrt{2}$, and the antenna efficiencies are equal, then symmetric changes $\delta$ in phase difference may be achieved by setting $\phi_1=-\delta/2$ and $\phi_2=\delta/2$, or another combination such that $\delta=\phi_2-\phi_1$.

Figure 7:
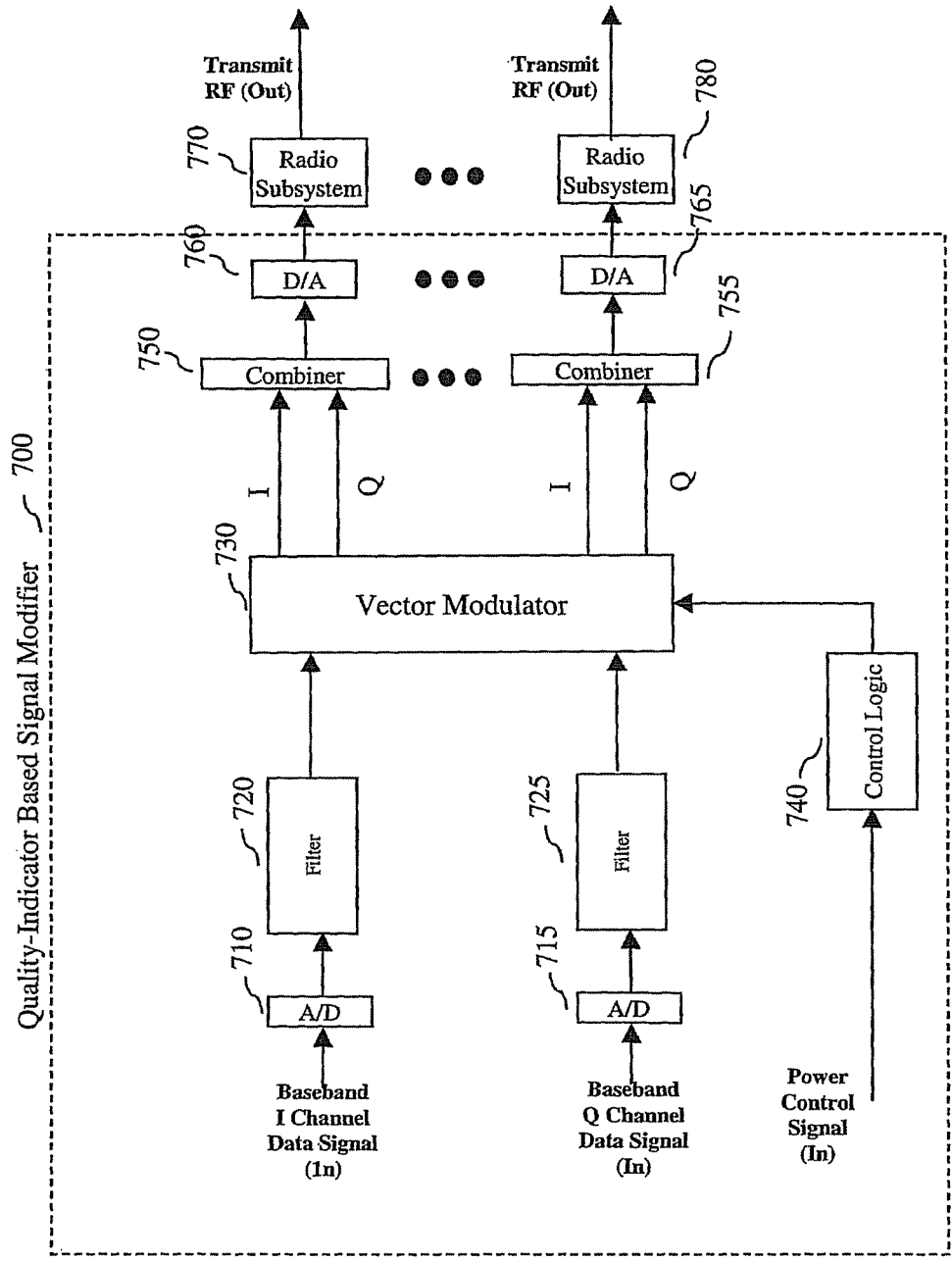
FIG. 7 shows a portion of the transmitter for the subscriber communication device according to another embodiment of the invention.

FIG. 7 shows a portion of the transmitter for the subscriber communication device according to another embodiment of the invention. The transmitter portion shown in FIG. 7 receives analog baseband signals (labeled in FIG. 7 as "Baseband I Channel Data Signal (In)" and "Baseband Q Channel Data Signal (In)") into a quality-indicator signal modifier 700.

Quality-indicator based signal modifier 700 includes A/D converters 710 and 715, filters 720 and 725, vector modulator 730, control logic 740, combiners 750 and 755, and D/A converters 760 and 765. D/A converters 760 and 765 of quality-indicator signal modifier 700 are coupled to radio subsystem 770 and 780, respectively.

A/D converter 710 receives the baseband in-phase signal. A/D converter 715 receives the baseband quadrature pre-transmission signal. A/D converters 710 and 715 are coupled to filters 720 and 725, respectively, which are in turn coupled to vector modulator 730. Control logic 740 receives the power-control signal and forwards complex weighting values to modulator 730. Vector modulator 730 is coupled to combiners 750 through 755.

Combiner 755, D/A converter 760 and radio subsystem 770 uniquely correspond to a given antenna element from the set of antenna elements for the subscriber communication device (not shown in FIG. 7). This set of components is also present corresponding to the number of antenna elements for the subscriber communication device. Consequently, combiner 755, D/A converter 765 and radio subsystem 780 are also shown corresponding to a different antenna element from the set of antenna elements. Any number of additional sets of components can be present corresponding to the number of antenna elements.

Figure 8:
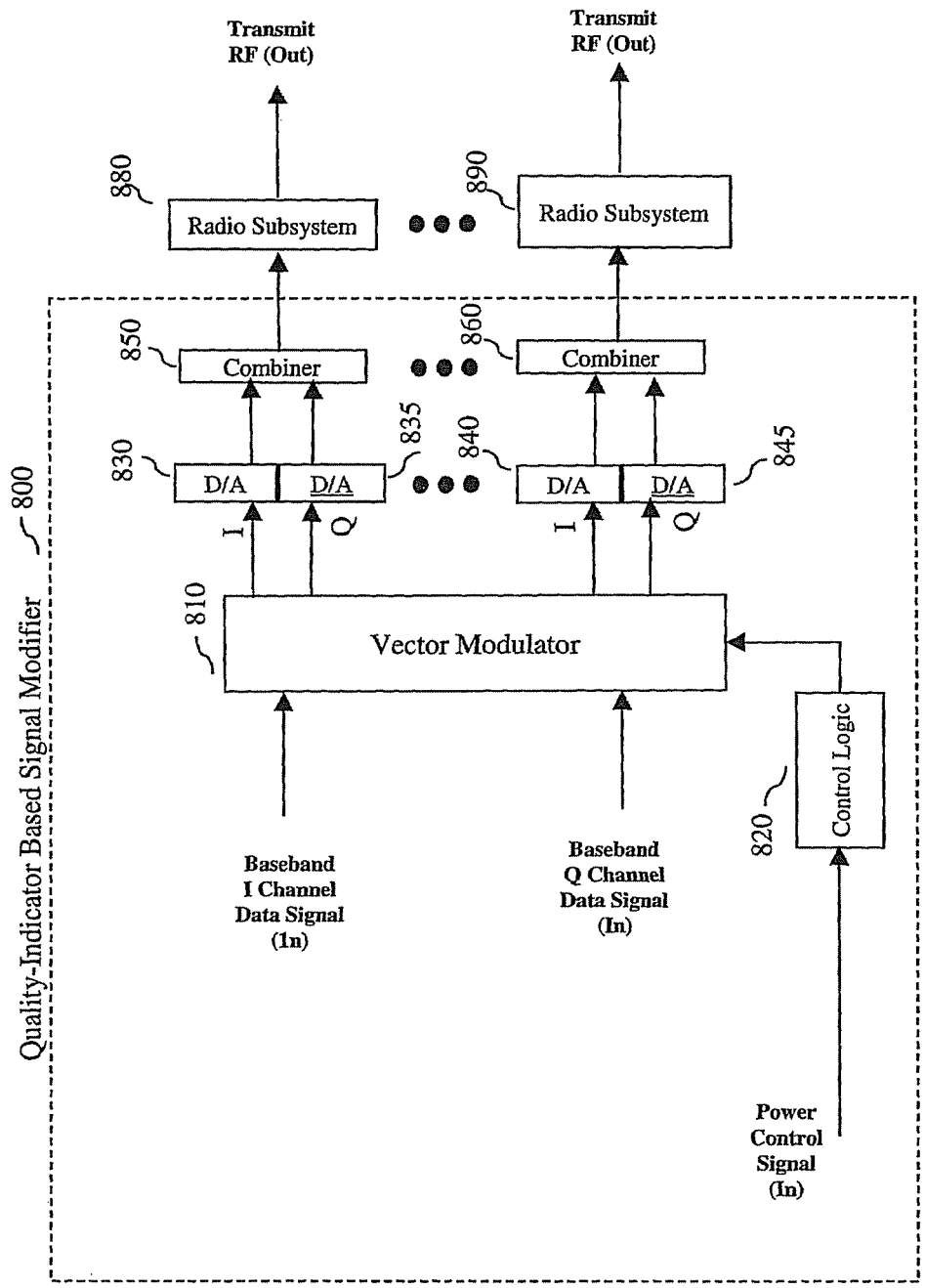
FIG. 8 shows a transmitted portion of a subscriber communication device according to yet another embodiment of the invention.

FIG. 8 shows a transmitter portion of a subscriber communication device according to yet another embodiment of the invention. More specifically, FIG. 8 shows a quality-indicator signal modifier that receives baseband digital signals.

Quality-indicator based signal modifier 800 includes vector modulator 810, control logic 802, D/A converters 830, 835, 840 and 845, and combiners 850 and 860. Combiners 850 and 860 of quality-indicator based signal modifier 800 are coupled to radio subsystems 870 and 880, respectively.

Control logic 820 receives a power-control signal and produces complex weighting values, which are provided to vector modulator 810. Vector modulator 810 also receives a digital baseband in-phase pre-transmission signal and a digital baseband quadrature pre-transmission signal. Vector modulator 810 splits the in-phase and quadrature pre-transmission signal components into a number of signals that correspond to the number of antenna elements for the subscriber communication device. The complex weighting values are then applied to the in-phase and quadrature pre-transmission signal associated for each antenna element from the set of antenna elements for the subscriber communication device to produce modified pre-transmission signals. These modified pre-transmission signals are then provided to D/A converters 830 through 845, which convert the digital form of the modified pre-transmission signals into analog form and forward these pre-transmission signals to combiners 850 and 860, respectively. Combiner 850 receives the in-phase and quadrature components of the modified pre-transmission signals from D/A converters 830 and 835, respectively. Combiner 850 adds these two signals and forwards the added signal to radio subsystem 870. Similarly, combiner 860 receives the analog in-phase and quadrature signal components of the modified pre-transmission signals from D/A converters 840 and 850, respectively and adds the signals. Combiner 860 adds these two signals and forwards the added signals to radio subsystem 880.

Figure 9:
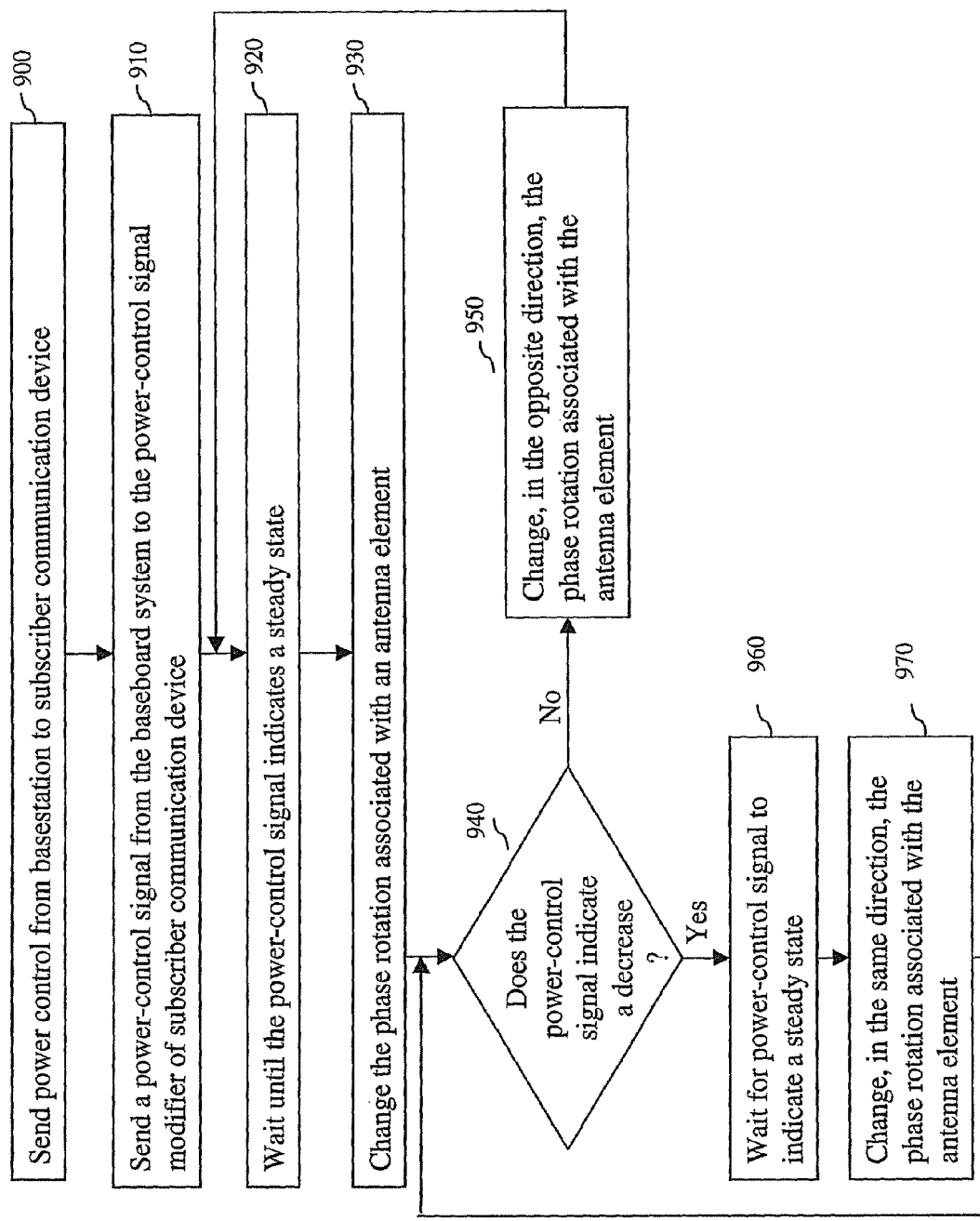
FIG. 9 shows a flowchart for calculating the complex weighting by adjusting the phase rotation associated with each antenna element, according to one embodiment.

FIG. 9 shows a flowchart for calculating the complex weighting by adjusting the phase rotation associated with each antenna element, according to an embodiment. Although FIG. 9 will be described in reference to FIGS. 1, 5 and 6 for convenience, the method described in reference to FIG. 9 can be used with any configuration of a subscriber communication device. In addition, although the quality-indication signal can be any appropriate type of signal that provides information to the subscriber communication device on the quality of the signal, for convenience of discussion, the quality-indication signal is assumed be to power-control signal according to the CDMA protocol.

At step 900, a power-indication signal is sent from basestation 110 to subscriber communication device 120 via wireless connection 130. At step 910, the power-control signal is sent from the baseband subsystem 121 to the quality-indicator based signal modifier 122 (also shown as quality-indicator based signal modifier 500 in FIG. 5). The power-control signal according to the CDMA protocol indicates one of two possible values for any given time period: an "up" value or a "down" value. An "up" value represents an indication from the basestation to the subscriber communication device that the subscriber communication device should increase the total power of its transmitted signal. A "down" value represents an indication from the basestation to the subscriber communication device that the subscriber communication device should decrease the total power of its transmitted signal. The particular value of the power-control signal is also referred to herein as including a power-control bit, which represents either the up or down values in binary form.

At step 920, the process is held until the power-control signal reaches a steady state. The power-control signal can reach a steady state in a number of ways. For example, a consecutive sequence of power-control signals of up-downup or down-up-down. Once the power-control signal reaches a steady state, the process proceeds to step 930.

At step 930, the phase rotation associated with one antenna element is adjusted. Returning to FIGS. 5 and 6, control logic 502 calculates a new complex weighting so that the phase rotation for one antenna element is changed. This complex weighting is provided to the signal adjusters for that antenna element (e.g., signal adjusters 620 and 640, or signal adjusters 630 and 650). Upon receiving the complex weighting, these signal adjusters adjust the phase rotation thereby modifying the signal component sent from that antenna element and, consequently, modifying the total power of the transmitted signal.

At conditional step 940, the control logic 502 determines whether the power-control signal for a subsequent time period indicates a decrease, e.g., represented by a down value. If the power-control signal indicates a decrease, then the adjustment to the phase rotation for the one antenna element resulted in the basestation receiving the transmitted signal more optimally. In other words, because the basestation received the transmitted signal with increased total power, the basestation will send a down indication in a subsequent power-control signal. The subscriber communication device can continue to attempt to optimize the phase rotation for that antenna element and simultaneously reduce the total power of the transmitted signal. The total power of the transmitted signal can be reduced because the subscriber communication device is communicating with the basestation in a more optimal manner.

At conditional step 940, if the power-control signal does not indicate a decrease for the total power of the transmitted signal (e.g., the power-control signal indicates an up value), then the phase rotation adjustment was not effective and the process proceeds to step 950. At step 950, logic control 502 changes the phase rotation associated with that antenna element to the opposite direction. Then, the process proceeds to step 920 where steps 920 through 940 are repeated based on the opposite direction for the phase rotation.

At conditional step 940, if the power-control signal indicates a decrease for the total power of the transmitted signal (e.g., the power-control signal indicates a down value), then the phase rotation adjustment was effective and the process proceeds to step 960. At step 960, the process is held until the power-control signal reaches a steady state. At step 970, logic control 502 changes the phase rotation associated with that antenna element to the same direction. Then, the process proceeds to step 920 where steps 920 through 940 are repeated based on the same direction for the phase rotation.

Figure 10:
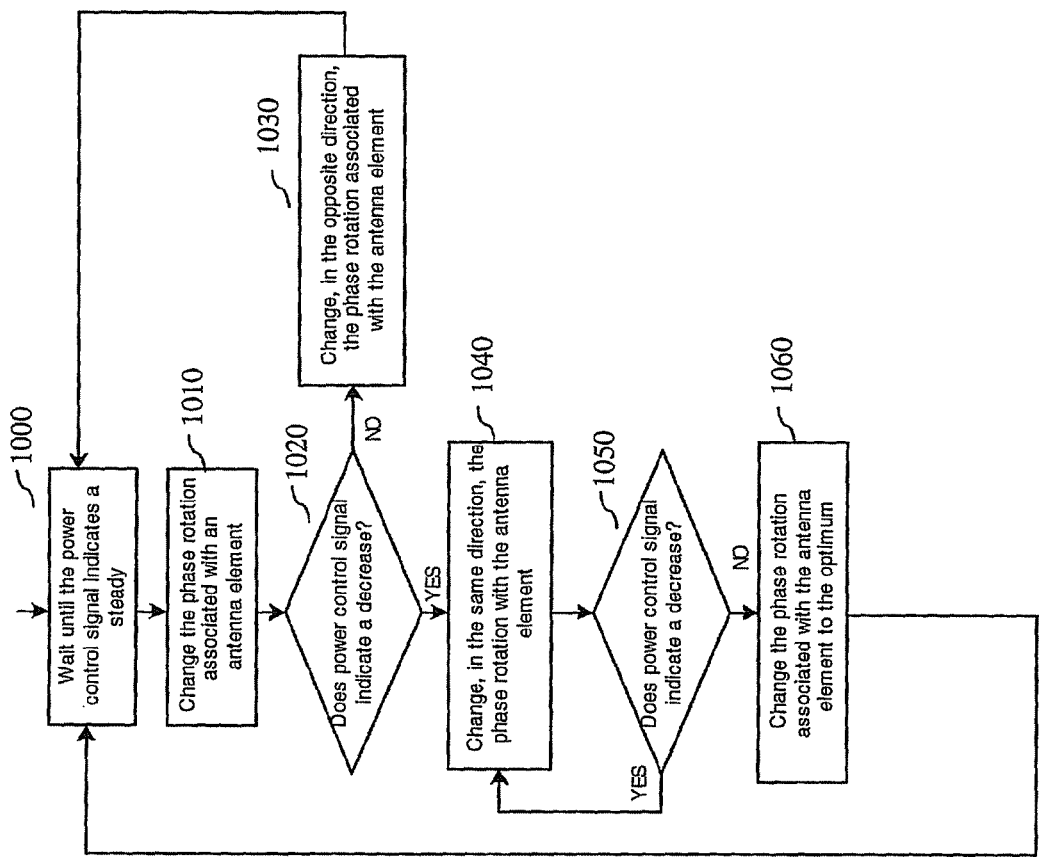
FIG. 10 shows a flowchart for calculating the complex weighting by adjusting the phase rotation associated with each antenna element, according to another embodiment.

FIG. 10 shows a flowchart for calculating the complex weighting by adjusting the phase rotation associated with each antenna element, according to yet another embodiment. At step 1000, the process is held until the power-control signal reaches a steady state. Once the power-control signal reaches a steady state, the process proceeds to step 1010. At step 1010, the phase rotation associated with one antenna element is adjusted based of a new complex weighting calculated by control logic 502.

At conditional step 1020, the control logic 502 determines whether the power-control signal for a subsequent time period indicated a decrease for the total power of the transmitted power, e.g., represented by a down value. If the power-control signal indicates a decrease, then the adjustment to the phase rotation for the one antenna element resulted in the basestation receiving the transmitted signal more optimally. Consequently, the selected direction for the phase rotation is correct and further adjustments to the phase rotation in the same direction may result in a further optimized transmitted signal.

At conditional step 1020, if the power-control signal does not indicate a decrease for the total power of the transmitted signal (e.g., the power-control signal indicates an up value), then the phase rotation adjustment was not effective and the process proceeds to step 1030. At step 1030, logic control 502 changes the phase rotation associated with that antenna element to the opposite direction. Then, the process proceeds to step 1000 where steps 1000 through 1020 are repeated based on the opposite direction for the phase rotation.

At step 1040, logic control 502 changes the phase rotation associated with that antenna element in the same direction. At conditional step 1050, the control logic 502 determines whether the power-control signal for a subsequent time period indicated a decrease, e.g., represented by a down value. If the power-control signal indicates a decrease, then the adjustment to the phase rotation was effective and again process proceeds to 1040. Steps 1040 and 1050 are repeated until the control logic 502 determines that the power-control signal for a subsequent time period indicates an increase for the total power of the transmitted power. At this point, the optimum phase rotation can be obtained by taking the average of the phase rotations during step 1040 and the process proceeds to step 1060. At step 1060, the phase rotation for the antenna element is returned to the previous optimal phase rotation value. Then, the process proceeds to step 1000 where the process is repeated for another antenna element. In this manner, the process can be repeated for each antenna element to obtain an overall optimum for the multiple antenna elements.

Figure 11:
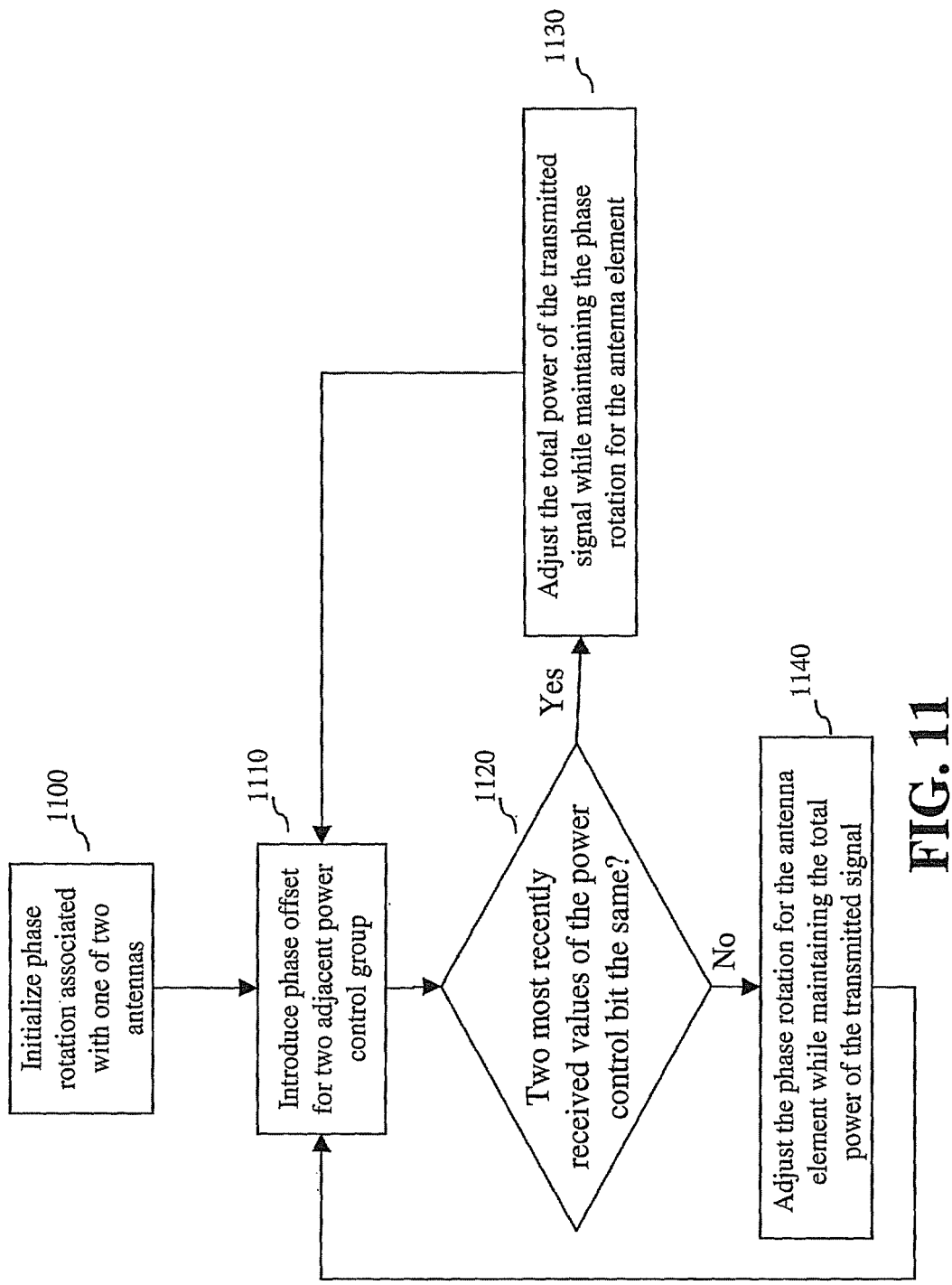
FIG. 11 shows a flowchart for calculating the complex weighting by adjusting the phase rotation associated with each antenna element, according to yet another embodiment.

FIG. 11 shows a flowchart for calculating the complex weighting by adjusting the phase rotation associated with each antenna element, according to another embodiment. FIG. 11 describes a method where the two most recently received values for the power-control bits are used to determine the proper phase rotation, and consequently, the proper complex weighting.

In this embodiment, the subscriber communication device using the CDMA protocol sends a signal of two adjacent power control groups (PCGs) in such a manner that the power associated with both PCGs are at the same level P. To simplify this discussion, assume for this embodiment that the subscriber communication device has two antenna elements, although any number of multiple antenna elements is possible. The phase rotation of the second antenna element relative to the first antenna element in the fast PCG is Phi. The phase rotation of the second antenna element relative to the first antenna element in the second PCG is Phi+Delta.

The phase rotation offset (referred to as "Delta") introduced between the first and second PCG provides a mechanism to determine the direction of the phase rotation between the two antenna elements that will improve the signal quality received at the basestation. Consequently, the complex weighting can be calculated by the following: if the value of the power-control bit for the most recent time period corresponds to the value of the power-control bit for the second most recent time period, the total power of the transmitted signal is adjusted while maintaining the phase rotation of the two antenna elements (i.e., maintaining Phi); if the value of the power-control bit for the most recent time period differs from the value of the power-control bit for the second time period, phase rotation of the two elements (i.e., Phi) is adjusted while maintaining the total power of the transmitted signal. The following more fully discusses this embodiment.

At step 1100, a phase rotation associated with one of the two antenna elements is initialized. At step 1110, phase rotation offset (also referred to above as Delta) is introduced for two adjacent PCGs. Based on this introduced phase rotation offset, a transmitted signal is sent from the subscriber communication device to the basestation. Then, the basestation sends a power-control signal based on this received transmitted signal.

At conditional step 1120, a determination is made as to whether the two most recently received values for the power-control bit are same. In other words, the power-control bit will have a particular value for each time period. For example, this time period for the CDMA and the WCDMA protocols is 1.25 msec and 666 .mu.sec, respectively. The determination at step 1120 compares the value for the power-control bit at the most recent time period to the value for the power-control bit at the second most recent time period. If the two values for the power-control bit correspond, the process proceeds to step 1130. If the two values for the power-control bit differ, the process proceeds to step 1140.

At step 1130, the total power of the transmitted signal is adjusted while maintaining the phase rotation for the antenna element. Control logic 502 adjusts the total power of the transmitted signal and maintains the phase rotation for the two antenna elements by appropriately calculating new complex weighting. Then, the process proceeds to step 1110 so that the process is repeated.

At step 1140, the phase rotation for the two antenna elements is adjusted while maintaining total power of the transmitted signal. Control logic 502 adjusts the phase rotation for the antenna and maintains the total power of the transmitted signal by appropriately calculating new complex weighting. Then, the process proceeds to step 1110 so that the process is repeated.

In this manner, the two most recently received values for the power-control bits are used to determine the proper phase rotation, and consequently, a proper complex weighting. Although the total power of the transmitted signal is adjusted according to this embodiment, the power ratios of the respective antenna elements are not adjusted. The embodiments discussed below in connection with FIGS. 12 and 13 address the calculation of complex weighting so that the total power of the transmitted signal, the phase rotation and the power ratio of the antenna elements are adjusted.

Figure 12:
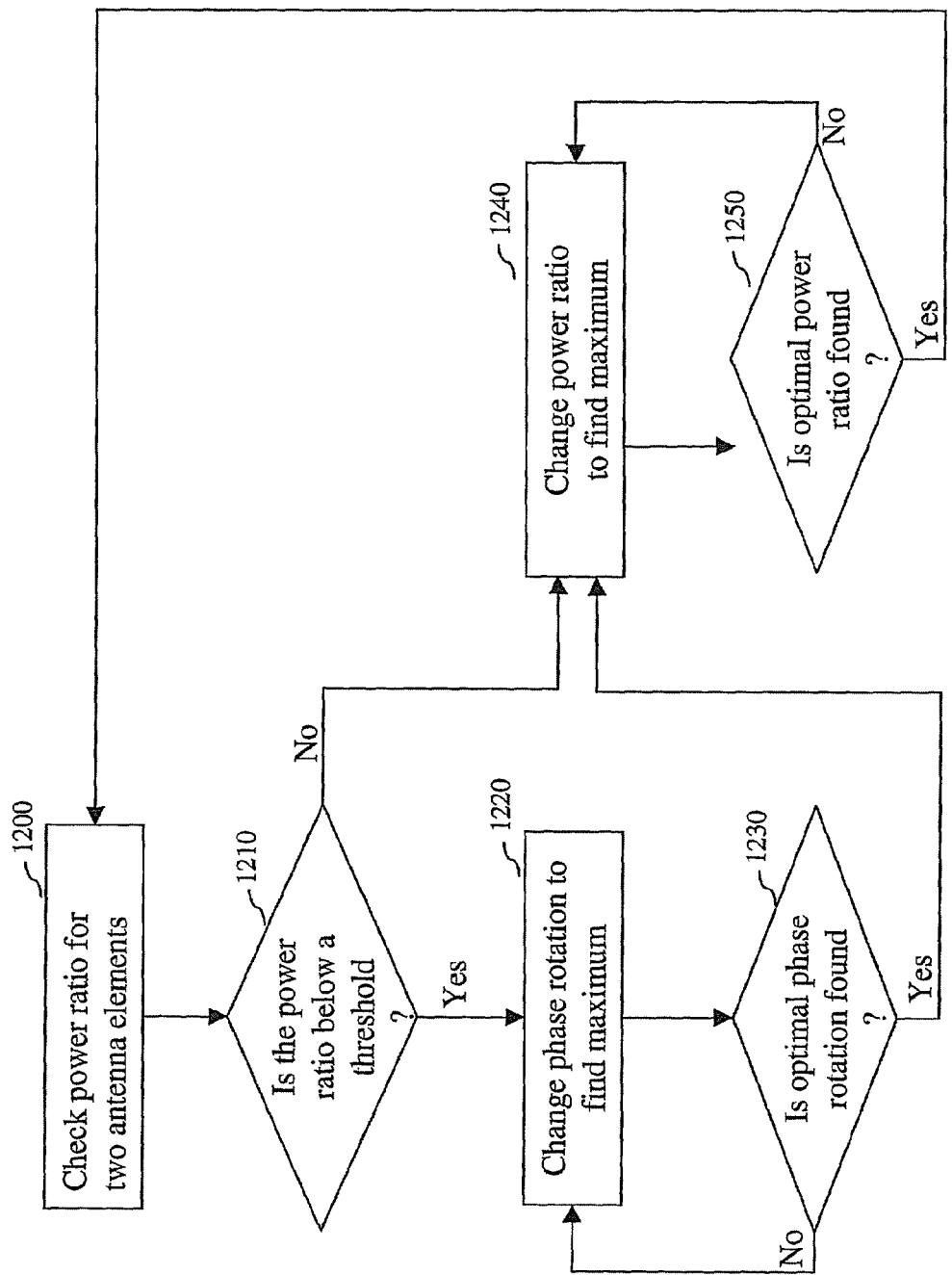
FIG. 12 shows a flowchart for calculating the complex weighting by adjusting the power ratio and the phase rotation associated with each antenna element, according to an embodiment of the invention.

FIG. 12 shows a flowchart for calculating the complex weighting by adjusting the power ratio and the phase rotation associated with each antenna element, according to an embodiment of the invention. In this embodiment, an element threshold detection is considered before adjusting any phase rotation or power ratio for the antenna elements. Again, to simplify this discussion, assume for this embodiment that the subscriber communication device has two antenna elements, although any number of multiple antenna elements is possible. By checking the ratio of the antenna elements, the basestation can provide feedback using the power-control bit of the power-control signal.

More specifically, based on the threshold values, the phase rotation can be adjusted to converge on a substantially optimal phase rotation value. Having determined the substantially optimal phase rotation value, the power ratio value for the antenna elements can be calculated until a substantially optimal power ratio value is converged upon. The process is iterative and can be interrupted at any time to change any parameter, such as the phase rotation or the power ratio.

At step 1200, the power ratio for the two antenna elements is measured. At conditional step 1210, a determination is made as to whether the power ratio is below a predetermined threshold. If the power ratio is not below the predetermined threshold, then the process proceeds to step 1240. If the power ratio is below the predetermined threshold, then the process proceeds to step 1220 to tune the phase rotation.

At step 1220, the phase rotation is changed to find a maximum value. At conditional step 1230, the phase rotation is checked to determine whether it is a substantially optimal value. If the phase rotation is not a substantially optimal value, the process proceeds to step 1220 where the process for finding a substantially optimal value of the phase rotation continues. If the phase rotation is a substantially optimal value, then the process proceeds to step 1240.

At step 1240, the power ratio is changed to find a maximum value. At conditional step 1250, the power ratio is checked to determine whether it is a substantially optimal value. If the power ratio is not a substantially optimal value, the process proceeds to step 1240 where the process for finding a substantially optimal value of the power ratio continues. If the power ratio is a substantially optimal value, then the process proceeds to step 1200, where the overall process repeats.

In sum, the complex weighting can be calculated by adjusting the phase rotation associated with the antenna elements first, and then adjusting the power ratio associated with the antenna elements. In this manner, both the phase rotation and the power ratio can be adjusted to optimize substantially the transmitted signal sent from the subscriber communication device at received at the basestation.

Figure 13:
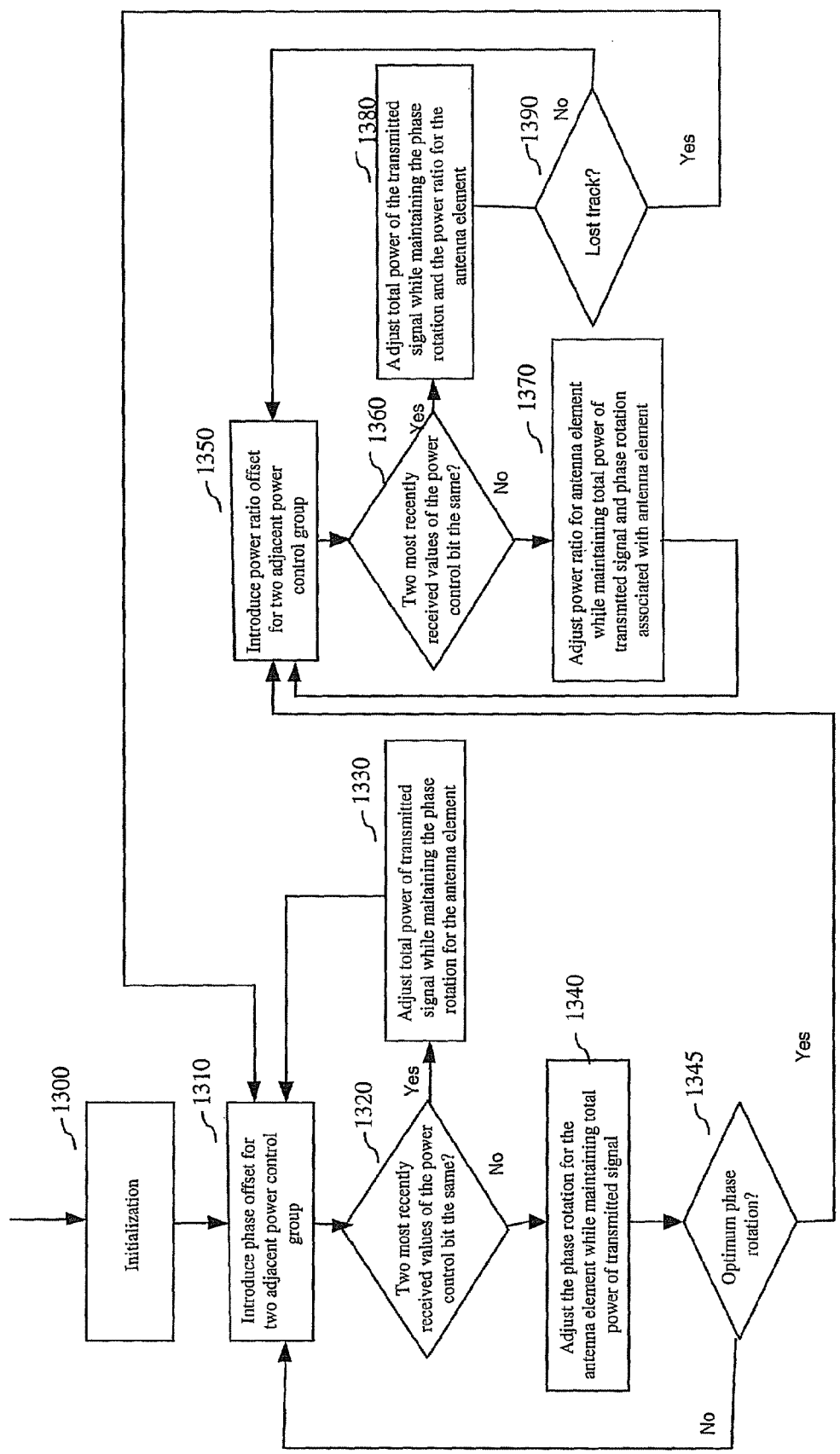
FIG. 13 shows a flowchart for calculating the complex weighting by adjusting the power ratio and the phase rotation associated with each antenna element, according to another embodiment of the invention.

FIG. 13 shows a flowchart for calculating the complex weighting by adjusting the power ratio and the phase rotation associated with each antenna element, according to another embodiment of the invention. Similar to FIG. 11, FIG. 13 describes a method where the two most recently received values for the power-control bit are used to determine the proper phase rotation. In FIG. 13, however, the power ratio associated with the two antenna elements is adjusted after the phase rotation associated with the second antenna element is adjusted. The process of adjusting the power ratio is similar to that described above for adjusting the phase rotation in reference to FIG. 11.

In this embodiment, the subscriber communication device using the CDMA protocol sends a signal of two adjacent power control groups (PCGs) in such a manner that the power associated with both PCGs are at the same level P. Again, to simplify this discussion, assume for this embodiment that the subscriber communication device has two antenna elements, although any number of multiple antenna elements is possible.

The power ratio associated with the first PCG between the first antenna element and the second antenna element is Lambda. The power ratio associated with the second PCG between the first antenna element and the second antenna element is Lambda+Zeta. The power ratio offset (i.e., Zeta) introduced between the first and second PCG provides a mechanism to determine the direction of changing power ration between the two antenna elements that will improve the signal quality received at the basestation. Consequently, the complex weighting can be calculated by the following: if the value of the power-control bit for the most recently received time period corresponds to the value of the power-control bit for the second most recently received time period, the total power of the transmitted signal is adjusted while maintaining the power ratio of the two antenna elements; if the value of the power-control bit for the most recently received time period differs from the value of the power-control bit for the second most recently received time period, power ratio Lambda is adjusting while maintaining the total power of the transmitted signal. The following more fully discusses this embodiment.

At step 1300, a phase rotation and a power ratio associated with one of the two antenna elements is initialized. At step 1310, phase rotation offset (also referred to above as Delta) is introduced for two adjacent PCGs. Based on this introduced phase rotation offset, a transmitted signal is sent from the subscriber communication device to the basestation. Then, the basestation sends a power-control signal based on this received transmitted signal.

At conditional step 1320, a determination is made as to whether the two most recently received values for the power-control bit are same. If the two values for the power-control bits correspond, the process proceeds to step 1330. If the two values for the power-control bits differ, the process proceeds to step 1340.

At step 1330, the total power of the transmitted signal is adjusted while maintaining the phase rotation for the antenna element. Control logic 502 adjusts the total power of the transmitted signal and maintains the phase rotation for the two antenna elements by appropriately calculating new complex weighting. Note that during this step the power ratio for the two antenna elements are also maintained. Then, the process proceeds to step 1310 so that the process is repeated.

At step 1340, the phase rotation for the two antenna elements is adjusted while maintaining total power of the transmitted signal. Control logic 502 adjusts the phase rotation for the antenna and maintains the total power of the transmitted signal by appropriately calculating new complex weighting. Note that during this step the power ratio for the two antenna elements are also maintained. Then, the process proceeds to conditional step 1345.

At conditional step 1345, a determination is made as to whether the adjusted phase rotation produced by step 1340 is optimal. If the phase rotation is less than substantially optimal, then the process proceeds to step 1310. If the phase rotation is substantially optimal, then the process proceeds to step 1350.

At step 1350, power ratio offset (also referred to above as Zeta) is introduced for two adjacent PCGs. At conditional step 1350, a determination is made as to whether the two most recently received values for the power-control bit correspond. If the two most recently received values for the power-control bit correspond, the process proceeds to step 1380. If the two most recently received values for the power-control bit differ, the process proceeds to step 1370.

At step 1370, the power ratio for the antenna element is adjusted while maintaining total power of the transmitted signal and maintaining the phase rotation for the two antenna elements. Control logic 502 adjusts the power ratio for the antenna and maintains the total power of the transmitted signal and the phase rotation for two antenna elements by appropriately calculating new complex weighting. The process then proceeds to step 1350 so that steps 1350 and 1360 are repeated until the two values for the most recently received values for the power-control bit correspond.

At step 1380, the power of the transmitted signal is adjusted while maintaining the power ratio and the phase rotation for the antenna element. Control logic 502 adjusts the total power of the transmitted signal and maintains the power ratio and the phase rotation for the antenna element by appropriately calculating new complex weighting. At conditional step 1390, a determination is made as to whether the track is lost. If the track is not lost, then the process proceeds to step 1350 so that the process of tuning the power ratio associated with the antenna element and the total power of the transmitted signal are repeated in steps 1350 through 1390.

Returning to conditional step 1390, if the track is lost, then the process proceeds to step 1310 where the process of optimizing the phase rotation and then the power ratio is repeated in steps 1310 through 1390.

The above discussion discloses mobile transmit beamforming diversity systems using a quality-indication signal, which may not require any new standardized dynamic feedback signaling between the network and the mobile unit. The base station receiver may be unaware that the mobile unit is in open loop beamforming transmit diversity mode, i.e., no changes need to be made to the base station receiver processing (synchronization, channel estimation, demodulation, decoding) in order to accommodate mobile units in this mode. A similar performance can be achieved by the mobile transmit beamforming with phase shift only resulted in phase difference between the first stream and the second steam. Some algorithms of determining phase difference from one or more quality-indication signals, i.e., uplink power control bits, are presented here.

It will be recognized that generally, as discussed above, the phase difference between the antenna signals may be used to produce beamforming, such that varying a phase difference may change the direction of the beam formed by constructive interference of the signals. Accordingly, feedback from the basestation, e.g., in the form of one or more power control bits, may be used to cause increased perceived power at the basestation by directing the beam to form at the base station using changes in phase rotation. One method according to embodiments of the invention for maximizing perceived power at the basestation using phase rotation is described herein.

In some embodiments of the invention, in order to determine a value for a new phase difference, the phase rotation may be varied by successive adjustments, e.g., $-/+\delta/2$, such that in one transmission the phase rotation is $\Delta-\delta/2$, and in a subsequent transmission, the phase rotation is $\Delta+\delta/2$. Thus, in one transmission, one antenna may transmit using $\Phi$, and the other antenna one antenna may transmit using phase $\Phi+\Delta-\delta/2$, and in a second transmission, one antenna may transmit using phase $\Phi$, and the other antenna one antenna may transmit using $\Phi+\Delta+\delta/2$. The power control signals corresponding to these two transmissions may be received, and compared. If the first transmission resulted in a POWER DOWN, and the second transmission resulted in a POWER UP, then the first transmission was received with higher perceived power, and $\Delta$ may be incremented in the direction of $-\delta/2$. If the first transmission resulted in a POWER UP, and the second transmission resulted in a POWER DOWN, then the second transmission was received with higher perceived power, and $\Delta$ may be incremented in the direction of $+\delta/2$.

Assume that uplink TPC command DOWN is represented by $-1$, and TPC command UP by $+1$. One beamforming algorithm applying phase change by test phase change offset, $+\delta$ or $-\delta$, every slot and/or by phase change step, $+\epsilon$ or $-\epsilon$, every two slots is presented as the following:

1. Initialize a relative phase between two transmitters, $\Delta\phi=-\delta/2$, for the first slot.
2. Apply test phase change positive offset for next slot, $\Delta\phi'=\Delta\phi+\delta$.
3. Apply test phase change negative offset for next slot, $\Delta\phi''=\Delta\phi'-\delta$.
4. Determine a phase change step from the most two recently received values of TPC, e.g., TPC1 and TPC2 (corresponding to $\Delta\phi$ and $\Delta\phi'$ for the first iteration, or corresponding to $\Delta\phi''$ and $\Delta\phi'$ for the second or later iterations), such that:

a. if TPC1>TPC2, i.e., TPC1=POWER UP, and TPC2=POWER DOWN, then the perceived power corresponding to $\Delta\phi$ was weaker than the perceived power corresponding to $\Delta\phi'$, and therefore $\Delta\phi=\Delta\phi''+\epsilon$.
b. if TPC2>TPC1, i.e., TPC1=POWER DOWN, and TPC2=POWER UP, then the perceived power corresponding to $\Delta\phi$ was stronger than the perceived power corresponding to $\Delta\phi'$, and therefore $\Delta\phi=\Delta\phi''-\epsilon$.
c. otherwise, no change to $\Delta\phi$, i.e., ($\Delta\phi=\Delta\phi''$).
5. Go to step 2.

If TPC1 and TPC2 are available before step 3, the response latency of above algorithm applying phase change step every two slots can be further reduced by swapping step 3 and step 4 as the following:
1. Initialize a relative phase between two transmitters, $\Delta\phi=-\delta/2$, for the first slot.
2. Apply test phase change positive offset for next slot, $\Delta\phi'=\Delta\phi+\delta$.
3. Determine a phase change step from the most two recently received values of TPC, e.g., TPC1 and TPC2 (corresponding to $\Delta\phi$ and $\Delta\phi'$), such that:
  a. if TPC1>TPC2, then $\Delta\phi'=\Delta\phi'+\epsilon$.
  b. if TPC2>TPC1, then $\Delta\phi'=\Delta\phi'-\epsilon$.
  c. otherwise, no change to $\Delta\phi'$.
4. Apply test phase change negative offset for next slot, $\Delta\phi=\Delta\phi'-\delta$.
5. Go to step 2.

Another beamforming algorithm applying phase change by tested phase change offset, $+\delta$ or $-\delta$, every slot and phase change step, $+\epsilon$ or $-\epsilon$, every slot is presented as the following:
1. Initial relative phase between two transmitters, $\Delta\phi=-\delta/2$, for the first slot.
2. Apply test phase change positive offset for the next slot, $\Delta\phi'=\Delta\phi+\delta$.
3. Apply test phase change negative offset for the next slot, $\Delta\phi''=\Delta\phi'-\delta$.
4. Determine a phase change step from the most two recently received values of TPC, e.g., TPC1 and TPC2 (corresponding to $\Delta\phi$ and $\Delta\phi'$), such that:
  a. if TPC1>TPC2, $\Delta\phi=\Delta\phi''+\epsilon$.
  b. if TPC2>TPC1, $\Delta\phi=\Delta\phi''-\epsilon$.
  c. otherwise, no change to $\Delta\phi$, i.e., ($\Delta\phi=\Delta\phi''$).
5. Apply test phase change offset for next slot, $\Delta\phi'=\Delta\phi+\delta$.
6. Determine new phase change step from the most two recently received values of TPC, e.g., TPC1 and TPC2 (corresponding to $\Delta\phi'$ and $\Delta\phi''$), such that:
  a. if TPC1>TPC2, $\Delta\phi=\Delta\phi'-\epsilon$.
  b. if TPC2>TPC1, $\Delta\phi=\Delta\phi'+\epsilon$.
  c. otherwise, no change to $\Delta\phi$, i.e., ($\Delta\phi=\Delta\phi'$).
7. Apply test phase change offset for next slot, $\Delta\phi''=\Delta\phi-\delta$.
8. Determine new phase change step from the most two recently received values of TPC, e.g., TPC1 and TPC2 (corresponding to $\Delta\phi''$ and $\Delta\phi'$), such that:
  a. if TPC1>TPC2, $\Delta\phi=\Delta\phi''+\epsilon$.
  b. if TPC2>TPC1, $\Delta\phi=\Delta\phi''-\epsilon$.
  c. otherwise, no change on $\Delta\phi$, i.e., ($\Delta\phi=\Delta\phi''$).
9. Go to step 5.

If TPC1 and TPC2 are available before step 3, the response latency of above algorithm applying phase change step every slot can be further reduced by swapping step 3 and step 4 as the following:
1. Initial relative phase between two transmitters, $\Delta\phi=-\delta/2$, for the first slot.
2. Apply test phase change positive offset for the next slot, $\Delta\phi'=\Delta\phi+\delta$.
3. Determine a phase change step from the most two recently received values of TPC, e.g., TPC1 and TPC2 (corresponding to $\Delta\phi$ and $\Delta\phi'$), such that:
  a. if TPC1>TPC2, $\Delta\phi'=\Delta\phi'+\epsilon$.
  b. if TPC2>TPC1, $\Delta\phi'=\Delta\phi'-\epsilon$.
  c. otherwise, no change to $\Delta\phi'$.
4. Apply test phase change negative offset for the next slot, $\Delta\phi=\Delta\phi'-\delta$.
5. Determine new phase change step from the most two recently received values of TPC, e.g., TPC1 and TPC2 (corresponding to $\Delta\phi'$ and $\Delta\phi$), such that:
  a. if TPC1>TPC2, $\Delta\phi=\Delta\phi'-\epsilon$.
  b. if TPC2>TPC1, $\Delta\phi=\Delta\phi'+\epsilon$.
  c. otherwise, no change to $\Delta\phi$, i.e., ($\Delta\phi=\Delta\phi'$).
6. Go to step 2.

Phase shift applied to both the first stream and to the second stream can be distributed in many ways to create the same phase difference change, $\Delta\phi=\Delta\phi\pm\delta\pm\epsilon$. For example, $\phi_1=\phi_1+\delta/2$ and $\phi_2=\phi_2-\delta/2\pm\epsilon$, or $\phi_1=\phi_1-\delta/2$ and $\phi_2=\phi_2+\delta/2\pm\epsilon$. Another example of distributing phase shift change is $\phi_2=\phi_2\pm\delta/2\pm\epsilon/2$ and $\phi_1=-\phi_2$.

Phase shift can also be applied to the second stream only. For example, $\phi_1=0$ and $\phi_2=\Delta\phi$.

Here, test phase change offset is applied every slot and new phase change step is determined from two most recently received TPC. However, without loss of generality, test phase change offset can be applied every two, three or more slots, and new phase change step can be determined from more than two most recently received TPC. For example, test phase change offset is applied every two slots and new phase change step is determined from four most recently received TPC.

The absolute value of test phase change offset, $|\delta|$, may be greater than or equal to the absolute value of phase change step, $|\epsilon|$. The ratio between $|\delta|$ and $|\epsilon|$ may be 1, or it may be 2, or it may be 3, or it may be 4.

The absolute value of test phase change offset, $|\delta|$, may be greater than or equal to the absolute value of phase change step, $|\epsilon|$. Thus, for example, $|\delta|$ may be equivalent to $|\epsilon|$. Accordingly, in one example, $|\delta|$ and $|\epsilon|$ may be a number between 5 and 20 degrees; in another example, $|\delta|$ and $|\epsilon|$ may be a number between 10 and 15 degrees; in yet another example, $|\delta|$ and $|\epsilon|$ may be 12 degrees.

The absolute value of test phase change offset, $|\delta|$, may be greater than or equal to two times the absolute value of phase change step, $|\epsilon|$. Accordingly, in one example, $|\delta|$ may be a number between 10 and 40 degrees, and 10 may be half that number, e.g., a number between 5 and 20 degrees; in another example, $|\delta|$ may be a number between 20 and 30 degrees, and $|\epsilon|$ may be half that number, e.g., a number between 10 and 15 degrees; in yet another example, $|\delta|$ may be 24 degrees and $|\epsilon|$ may be 12 degrees.

The absolute value of test phase change offset, $|\delta|$, may be greater than or equal to four times the absolute value of phase change step, $|\epsilon|$. Accordingly, in one example, $|\delta|$ may be a number between 20 and 80 degrees, and $|\epsilon|$ may be a quarter of that number, e.g., a number between 5 and 20 degrees; in another example, $|\delta|$ may be a number between 40 and 60 degrees, and $|\epsilon|$ may be a quarter of that number, e.g., a number between 10 and 15 degrees; in yet another example, $|\delta|$ may be 48 degrees and $|\epsilon|$ may be 12 degrees.

It will be recognized that in order to obtain accurate feedback using the TPC information, it is desirable that the UE should be able to match the TPC information with the transmission to which the base station responded. That is, for proper operation, the algorithm should be able to correctly match between UE phase perturbations and TPCs received from the BTS; specifically, the boundary between $-/+$ pairs needs to be determined correctly. That is, the TPC for $\Delta\phi-\delta$ should be identified, and the TPC for $\Delta\phi+\delta$ should be identified. However, different base stations and protocols may cause different delays between the UE's transmission and receipt of the base station response with a TPC command. Accordingly, in some embodiments of the invention, a UE may identify a protocol and/or possibly a manufacturer or model of the base station, and look up an appropriate delay. Thus, for example, identifying a protocol/manufacturer/model may result in considering a delay of 1 slot, or 2 slots, or 3 slots. The delay parameter may be considered in matching the TPC to the diversity transmission parameter. Thus, if a delay parameter is 1 slot, then a received TPC may be considered as corresponding to the immediately previous transmission. Similarly, if a delay parameter is 2 slots, then a received TPC may be considered as corresponding not to the immediately previous transmission, but the second-to-last transmission. Finally, if a delay parameter is 3 slots, then a received TPC may be considered as corresponding not to the last or second-to-last transmission, but to the third-to-last transmission.

The determination of the delay parameter may be made upon registration onto a network. For example, upon registration to a network, the UE may identify the network protocol, and make/model of the base station, then using a look-up table stored in its memory, the UE will identify the correct delay mentioned above and set it accordingly. Other methods of determining the appropriate delay may be possible. For example, the UE may conduct a test and measure the response time of the base station.

In addition, as the network and/or base station may change due to mobility of the UE, a similar procedure for determining the delay parameter may be repeated periodically each time the registration is altered.

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, although the previous description of the embodiments often referred to communication devices using a CDMA protocol, other types of protocols are possible. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

Note that although the tuning of a communication device is described through the use complex weighting, in other embodiments other types of control signals can tune the communication device. In other words, the tuning of a communication device through the use such control signals need not be limited to information about varying the magnitude and phase of the signal. For example, the control signals can carry information to vary the magnitude, phase, frequency and/or timing of the signal associated with each antenna element.

We claim:

1. A method for a mobile communications device to produce a new signal set, where said device has previously transmitted signal sets and previously received responsive power control signals, where said new signal set includes signals with a determined relative phase difference, and said mobile communications device includes a vector modulator, first and second antennae, a receiver, and a processor, comprising the steps of:

producing a first signal set with said vector modulator, said first signal set comprised of two signals with phases varied in opposite senses about a central phase so as to minimize changes in said central phase, transmitting said first signal set, each of said two signals transmitted by each of said first and second antennae to a distant communication device, receiving a power control signal in response from said distant communication device, determining a relative phase difference and power for said new signal set, said determination being a function of a plurality of previously transmitted signal sets and a plurality of previously received power control signals, producing a new signal set with said vector modulator, where said processor determines a relative phase difference for said signals in said new signal set, and transmitting said signals in said new signal set, wherein the step of determining the relative phase difference includes substantially optimizing the total power of the transmitted signal and the phase rotation associated with each of the first and second antennae in parallel while maintaining a power ratio associated with each antenna.

2. The method of claim 1, wherein the determining of the relative phase difference for said new signal set includes: detecting a steady state in a quality-indication signal; adjusting a phase rotation associated with the second antenna element; selecting a first direction for the phase rotation associated with the second antenna element, the first direction being selected to improve a received signal quality at the distant communication device; and adjusting the phase rotation associated with the second antenna element in the first direction until a boundary is detected.

3. The method of claim 2, wherein the quality-indication signal includes a first frame quality indicator according to a CDMA protocol.

4. The method of claim 1, wherein the determining of the relative phase difference for said new signal set includes:

detecting a steady state in a quality-indication signal at a first time; adjusting a phase rotation associated with the second antenna; selecting a first direction for the phase rotation associated with the second antenna, the first direction being selected to improve a received signal quality at the distant communication device; and adjusting the phase rotation associated with the second antenna in the first direction until a second steady state is detected in the quality-indication signal at a second time subsequent to the first time.

5. The method of claim 1, wherein the mobile communications device is a subscriber communication device; and the distant communication device is a base station.

* * * * *